(12) United States Patent
Jia et al.

(10) Patent No.: US 9,762,931 B2
(45) Date of Patent: Sep. 12, 2017

(54) ENCODING TIME MANAGEMENT IN PARALLEL REAL-TIME VIDEO ENCODING

(71) Applicant: Google Inc., Mountain View, CA (US)

(72) Inventors: Wei Jia, San Jose, CA (US); Qunshan Gu, Hayward, CA (US)

(73) Assignee: GOOGLE INC., Mountain View, CA (US)

( * ) Notice: Subject to any disclaimer, the term of this patent is extended or adjusted under 35 U.S.C. 154(b) by 89 days.

(21) Appl. No.: 14/807,124

(22) Filed: Jul. 23, 2015

(65) Prior Publication Data

US 2015/0326888 A1 Nov. 12, 2015

Related U.S. Application Data

(63) Continuation of application No. 13/313,272, filed on Dec. 7, 2011, now Pat. No. 9,100,657.

(51) Int. Cl.
*H04N 19/87* (2014.01)
*H04N 19/523* (2014.01)
(Continued)

(52) U.S. Cl.
CPC .......... *H04N 19/87* (2014.11); *H04N 19/102* (2014.11); *H04N 19/105* (2014.11);
(Continued)

(58) Field of Classification Search
CPC .. H04N 19/102; H04N 19/105; H04N 19/127; H04N 19/14; H04N 19/156;
(Continued)

(56) References Cited

U.S. PATENT DOCUMENTS

| 3,825,832 A | 7/1974 | Frei et al. |
| 4,719,642 A | 1/1988 | Lucas |

(Continued)

FOREIGN PATENT DOCUMENTS

| JP | 3510433 B2 | 3/2004 |
| JP | 2007166625 A | 6/2007 |

(Continued)

OTHER PUBLICATIONS

Armando J. Pinho; ExNCoding of Image Partitions, Using a Standard Technique for Lossless Image Compression; Dep. Electronica e Telecomunicacoes/ INESC Universidade de Aveiro, Portugal.

(Continued)

*Primary Examiner* — Christopher S Kelley
*Assistant Examiner* — Maria Vazquez Colon
(74) *Attorney, Agent, or Firm* — Young Basile Hanlon & MacFarlane, P.C.

(57) ABSTRACT

Techniques for efficient coding of digital media data are presented. A resource controller component dynamically allocates computing resources between an estimator component and a coder component. The estimator component generates an initial motion estimation of a raw video frame of a sequence of raw video frames based on a previous raw video frame. The coder component encodes the previous raw video frame to generate a reconstructed video frame in parallel with the generation of the initial motion estimation. When the previous raw video frame is reconstructed, the coder component dynamically determines whether and/or how to refine the motion estimation to encode the raw video frame based on a predefined encoding criterion. In making that determination, the coder component selects and uses a mode(s) of motion estimation refinement from a plurality of available motion estimation refinement modes to encode the raw video frame.

20 Claims, 12 Drawing Sheets

(51) Int. Cl.
*H04N 19/102* (2014.01)
*H04N 19/105* (2014.01)
*H04N 19/156* (2014.01)
*H04N 19/57* (2014.01)
*H04N 19/61* (2014.01)
*H04N 19/50* (2014.01)
*H04N 19/463* (2014.01)
*H04N 19/172* (2014.01)
*H04N 19/127* (2014.01)
*H04N 19/14* (2014.01)
*H04N 19/157* (2014.01)
*H04N 19/117* (2014.01)
*H04N 19/436* (2014.01)
*H04N 19/53* (2014.01)

(52) U.S. Cl.
CPC ........... *H04N 19/127* (2014.11); *H04N 19/14* (2014.11); *H04N 19/156* (2014.11); *H04N 19/157* (2014.11); *H04N 19/172* (2014.11); *H04N 19/463* (2014.11); *H04N 19/50* (2014.11); *H04N 19/523* (2014.11); *H04N 19/57* (2014.11); *H04N 19/61* (2014.11); *H04N 19/117* (2014.11); *H04N 19/436* (2014.11); *H04N 19/53* (2014.11)

(58) Field of Classification Search
CPC .. H04N 19/157; H04N 19/172; H04N 19/463; H04N 19/50; H04N 19/523; H04N 19/57; H04N 19/61; H04N 19/87; H04N 19/117; H04N 19/436; H04N 19/53
See application file for complete search history.

(56) References Cited

U.S. PATENT DOCUMENTS

| | | | |
|---|---|---|---|
| 4,729,127 A | 3/1988 | Chan et al. | |
| 4,736,446 A | 4/1988 | Reynolds et al. | |
| 4,797,729 A | 1/1989 | Tsai | |
| 4,868,764 A | 9/1989 | Richards | |
| 4,891,748 A | 1/1990 | Mann | |
| 5,068,724 A | 11/1991 | Krause et al. | |
| 5,083,214 A | 1/1992 | Knowles | |
| 5,091,782 A | 2/1992 | Krause et al. | |
| 5,136,371 A | 8/1992 | Savatier et al. | |
| 5,136,376 A | 8/1992 | Yagasaki et al. | |
| 5,164,819 A | 11/1992 | Music | |
| 5,225,832 A | 7/1993 | Wang et al. | |
| 5,270,812 A | 12/1993 | Richards | |
| 5,274,442 A | 12/1993 | Murakami et al. | |
| 5,313,306 A | 5/1994 | Kuban et al. | |
| 5,341,440 A | 8/1994 | Earl et al. | |
| 5,381,145 A | 1/1995 | Allen et al. | |
| 5,432,870 A | 7/1995 | Schwartz | |
| 5,452,006 A | 9/1995 | Auld | |
| 5,561,477 A | 10/1996 | Polit | |
| 5,576,765 A | 11/1996 | Cheney et al. | |
| 5,576,767 A | 11/1996 | Lee et al. | |
| 5,589,945 A | 12/1996 | Abecassis | |
| 5,604,539 A | 2/1997 | Ogasawara et al. | |
| 5,646,690 A | 7/1997 | Yoon | |
| 5,659,539 A | 8/1997 | Porter et al. | |
| 5,696,869 A | 12/1997 | Abecassis | |
| 5,734,744 A | 3/1998 | Wittenstein et al. | |
| 5,737,020 A | 4/1998 | Hall et al. | |
| 5,748,247 A | 5/1998 | Hu | |
| 5,774,593 A | 6/1998 | Zick et al. | |
| 5,793,647 A | 8/1998 | Hageniers et al. | |
| 5,794,179 A | 8/1998 | Yamabe | |
| 5,818,969 A | 10/1998 | Astle | |
| 5,828,370 A | 10/1998 | Moeller et al. | |
| 5,835,144 A | 11/1998 | Matsumura et al. | |
| 5,883,671 A | 3/1999 | Keng et al. | |
| 5,903,264 A | 5/1999 | Moeller et al. | |
| 5,929,940 A | 7/1999 | Jeannin | |
| 5,930,493 A | 7/1999 | Ottesen et al. | |
| 5,963,203 A | 10/1999 | Goldberg et al. | |
| 5,999,641 A | 12/1999 | Miller et al. | |
| 6,014,706 A | 1/2000 | Cannon et al. | |
| 6,041,145 A | 3/2000 | Hayashi et al. | |
| 6,061,397 A | 5/2000 | Ogura | |
| 6,084,908 A | 7/2000 | Chiang et al. | |
| 6,108,383 A | 8/2000 | Miller et al. | |
| 6,112,234 A | 8/2000 | Leiper | |
| 6,115,501 A | 9/2000 | Chun et al. | |
| 6,119,154 A | 9/2000 | Weaver et al. | |
| 6,141,381 A | 10/2000 | Sugiyama | |
| 6,160,846 A | 12/2000 | Chiang et al. | |
| 6,167,164 A | 12/2000 | Lee | |
| 6,181,742 B1 | 1/2001 | Rajagopalan et al. | |
| 6,181,822 B1 | 1/2001 | Miller et al. | |
| 6,185,363 B1 | 2/2001 | Dimitrova et al. | |
| 6,188,799 B1 | 2/2001 | Tan et al. | |
| 6,240,135 B1 | 5/2001 | Kim | |
| 6,292,837 B1 | 9/2001 | Miller et al. | |
| 6,327,304 B1 | 12/2001 | Miller et al. | |
| 6,366,704 B1 | 4/2002 | Ribas-Corbera et al. | |
| 6,370,267 B1 | 4/2002 | Miller et al. | |
| 6,400,763 B1 | 6/2002 | Wee | |
| 6,496,537 B1 | 12/2002 | Kranawetter et al. | |
| 6,522,784 B1 | 2/2003 | Zlotnick | |
| 6,529,638 B1 | 3/2003 | Westerman | |
| 6,560,366 B1 | 5/2003 | Wilkins | |
| 6,594,315 B1 | 7/2003 | Schultz et al. | |
| 6,687,303 B1 | 2/2004 | Ishihara | |
| 6,697,061 B1 | 2/2004 | Wee et al. | |
| 6,707,952 B1 | 3/2004 | Tan et al. | |
| 6,765,964 B1 | 7/2004 | Conklin | |
| 6,876,703 B2 * | 4/2005 | Ismaeil ............... H04N 19/56 375/240.16 |
| 6,934,419 B2 | 8/2005 | Zlotnick | |
| 6,985,526 B2 | 1/2006 | Bottreau et al. | |
| 6,987,866 B2 | 1/2006 | Hu | |
| 7,003,035 B2 | 2/2006 | Tourapis et al. | |
| 7,023,916 B1 | 4/2006 | Pandel et al. | |
| 7,027,654 B1 | 4/2006 | Ameres et al. | |
| 7,170,937 B2 | 1/2007 | Zhou | |
| 7,227,589 B1 | 6/2007 | Yeo et al. | |
| 7,236,524 B2 | 6/2007 | Sun et al. | |
| 7,330,509 B2 | 2/2008 | Lu et al. | |
| 7,499,492 B1 | 3/2009 | Ameres et al. | |
| 7,606,310 B1 | 10/2009 | Ameres et al. | |
| 7,764,739 B2 | 7/2010 | Yamada et al. | |
| 7,813,570 B2 | 10/2010 | Shen et al. | |
| 8,175,161 B1 | 5/2012 | Anisimov | |
| 8,179,963 B2 * | 5/2012 | Shibahara ............. H04N 19/51 375/240.12 |
| 8,401,084 B2 | 3/2013 | MacInnis | |
| 8,520,734 B1 | 8/2013 | Xu | |
| 8,743,979 B2 | 6/2014 | Lee et al. | |
| 8,767,817 B1 | 7/2014 | Xu et al. | |
| 9,100,509 B1 | 8/2015 | Jia et al. | |
| 9,100,657 B1 | 8/2015 | Jia et al. | |
| 2002/0012396 A1 | 1/2002 | Pau et al. | |
| 2002/0031184 A1 | 3/2002 | Iwata | |
| 2002/0039386 A1 | 4/2002 | Han et al. | |
| 2002/0168114 A1 | 11/2002 | Valente | |
| 2003/0023982 A1 | 1/2003 | Lee et al. | |
| 2003/0189982 A1 | 10/2003 | MacInnis | |
| 2003/0215018 A1 | 11/2003 | MacInnis et al. | |
| 2003/0219072 A1 | 11/2003 | MacInnis et al. | |
| 2004/0028142 A1 | 2/2004 | Kim | |
| 2004/0066852 A1 | 4/2004 | MacInnis | |
| 2004/0120400 A1 | 6/2004 | Linzer | |
| 2004/0228410 A1 | 11/2004 | Ameres et al. | |
| 2004/0240556 A1 | 12/2004 | Winger et al. | |
| 2004/0258151 A1 | 12/2004 | Spampinato | |
| 2005/0050002 A1 | 3/2005 | Slotznick | |
| 2005/0117655 A1 | 6/2005 | Ju | |
| 2005/0147165 A1 | 7/2005 | Yoo et al. | |
| 2005/0169374 A1 | 8/2005 | Marpe et al. | |
| 2005/0210145 A1 | 9/2005 | Kim et al. | |

(56) References Cited

U.S. PATENT DOCUMENTS

| | | |
|---|---|---|
| 2005/0265447 A1 | 12/2005 | Park |
| 2005/0265461 A1 | 12/2005 | Raveendran |
| 2005/0276323 A1 | 12/2005 | Martemyanov et al. |
| 2006/0072674 A1 | 4/2006 | Saha et al. |
| 2006/0098737 A1 | 5/2006 | Sethuraman et al. |
| 2006/0109912 A1 | 5/2006 | Winger et al. |
| 2006/0114985 A1 | 6/2006 | Linzer |
| 2006/0126726 A1 | 6/2006 | Lin et al. |
| 2006/0126740 A1 | 6/2006 | Lin et al. |
| 2006/0150151 A1 | 7/2006 | Dubinsky |
| 2006/0215758 A1 | 9/2006 | Kawashima |
| 2006/0239345 A1 | 10/2006 | Taubman et al. |
| 2006/0256858 A1 | 11/2006 | Chin |
| 2006/0291567 A1 | 12/2006 | Filippini et al. |
| 2007/0025441 A1 | 2/2007 | Ugur et al. |
| 2007/0053443 A1 | 3/2007 | Song |
| 2007/0086528 A1 | 4/2007 | Mauchly et al. |
| 2007/0092006 A1 | 4/2007 | Malayath |
| 2007/0140342 A1 | 6/2007 | Karczewicz et al. |
| 2007/0229704 A1 | 10/2007 | Mohapatra et al. |
| 2007/0286288 A1 | 12/2007 | Smith et al. |
| 2008/0056348 A1 | 3/2008 | Lyashevsky et al. |
| 2008/0152014 A1 | 6/2008 | Schreier et al. |
| 2008/0159407 A1 | 7/2008 | Yang et al. |
| 2008/0198270 A1 | 8/2008 | Hobbs et al. |
| 2008/0198920 A1 | 8/2008 | Yang et al. |
| 2008/0212678 A1 | 9/2008 | Booth et al. |
| 2008/0240254 A1 | 10/2008 | Au et al. |
| 2009/0003447 A1 | 1/2009 | Christoffersen et al. |
| 2009/0080534 A1 | 3/2009 | Sekiguchi et al. |
| 2009/0225845 A1 | 9/2009 | Veremeev et al. |
| 2009/0238277 A1* | 9/2009 | Meehan ............... H04N 19/124 375/240.16 |
| 2009/0249178 A1 | 10/2009 | Ambrosino et al. |
| 2010/0061455 A1 | 3/2010 | Xu et al. |
| 2010/0177826 A1 | 7/2010 | Bhaumik et al. |
| 2010/0183076 A1* | 7/2010 | Yoon .................... H04N 19/105 375/240.16 |
| 2010/0189179 A1 | 7/2010 | Gu et al. |
| 2010/0215263 A1 | 8/2010 | Imanaka |
| 2010/0239181 A1 | 9/2010 | Lee et al. |
| 2010/0246665 A1 | 9/2010 | Brederson et al. |
| 2011/0261884 A1 | 10/2011 | Rubinstein et al. |
| 2012/0014451 A1 | 1/2012 | Lee et al. |
| 2012/0128069 A1 | 5/2012 | Sato |
| 2012/0147958 A1 | 6/2012 | Ronca et al. |
| 2012/0213448 A1 | 8/2012 | Malmborg et al. |
| 2012/0294376 A1 | 11/2012 | Tanaka et al. |
| 2012/0307892 A1 | 12/2012 | Xu et al. |
| 2013/0034150 A1 | 2/2013 | Sadafale |
| 2013/0083161 A1 | 4/2013 | Hsu et al. |
| 2013/0259137 A1 | 10/2013 | Kuusela |
| 2015/0043645 A1 | 2/2015 | Ventela |

FOREIGN PATENT DOCUMENTS

| | | |
|---|---|---|
| WO | WO2008020470 A1 | 2/2008 |
| WO | WO2008036237 A2 | 3/2008 |
| WO | WO2010063184 A1 | 6/2010 |

OTHER PUBLICATIONS

B. Vasudev & N. Merhav, "DCT Mode Conversions for Field/Frame Coded MPEG Video", IEEE 2d Workshop on Multimedia Signal Processing 605-610 (Dec. 1998).

Bankoski et al. "Technical Overview of VP8, an Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Fore June "An Introduction to Digital Video Data Compression in Java", Chapter 12: DPCM video Codec, CreateSpace, Jan. 22, 2011.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

ISR and Written Opinion Issued in co-pending PCT International Application No. PCT/US2013/034581 dated Jun. 11, 2013.

Li E Q et al., "Implementation of H.264 exNCoder on general-purpose processors with hyper-threading technology", Proceedings of SPIE, pp. 384-395, vol. 5308, No. 1, Jan. 20, 2004.

Mozilla, "Introduction to Video Coding Part 1: Transform Coding", Video Compression Overview, Mar. 2012, 171 pp.

ON2 Technologies IxNC., White Paper TrueMotion VP7 Video Codec, Jan. 10, 2005, 13 pages, Document Version: 1.0, Clifton Park, New York.

ON2 Technologies, IxNC., White Paper On2's TrueMotion VP7 Video Codec, Jul. 11, 2008, pp. 7 pages, Document Version:1.0, Clifton Park, New York.

Overview; VP7 Data Format and Decoder. Version 1.5. On2 Technologies, IxNC. Dated Mar. 28, 2005.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

Sharp, "Entropy slices for parallel entropy decoding", ITU-T SG16 Meeting, Apr. 22, 2008-Feb. 5, 2008, Geneva.

Sze, "Massively Parallel CABAC", VCEG meeting, Jan. 7, 2009, London and MPEG meeting, Aug. 7, 2009, Geneva.

T. Chen, Y.H. Ng; Lossless Color Image Compression Technique for Multimedia Applications; IBM Technical Disclosure Bulletin; vol. 37 No. 10, Oct. 1994.

Tasdizen, et al; "A High PerformaxNCe Reconfigurable Motion Estimation Hardware Architecture", Design, Automation & Test in Europe ConferexNCe & Exhibition, Apr. 20, 2009, IEEE, Piscataway, NJ, US pp. 882-885.

Vos, Luc De and Stegherr, Michael; "Parameterizable VLSI Architectures for the Full-Search Block-Matching Algorithm", IEEE Transactions on Circuits and Systems, vol. 36, No. 10, Oct. 1989 NY US pp. 1309-1316.

VP6 Bitstream & Decoder Specification. Version 1.02. On2 Technologies, IxNC. Dated Aug. 17, 2006.

VP6 Bitstream & Decoder Specification. Version 1.03. On2 Technologies, IxNC. Dated Oct. 29, 2007.

VP8 Data Format and Decoding Guide. WebM Project. Google On2. Dated: Dec. 1, 2010.

(56) References Cited

OTHER PUBLICATIONS

Wiegand et al, "Overview of the H 264/AVC Video Coding Standard," IEEE Transactions on Circuits and Systems for Video Technology, vol. 13, No. 7, pp. 568, 569, Jul. 1, 2003.
Youn et al., "Motion Vector Refinement for high-performaxNCe Transcoding" IEEE Transactions on Multimedia, vol. 1, No. 1, Mar. 1999.
Yao Wang, "Motion Estimation for Video coding", EE4414: Motion Estimation basics, 2005.

* cited by examiner

ENCODING TIME MANAGEMENT IN PARALLEL REAL-TIME VIDEO ENCODING

TECHNICAL FIELD

This disclosure relates generally to video processing, and more specifically to encoding time management in parallel real-time video encoding.

BACKGROUND

The amount of data representing media information, such as a still image and video image, can be extremely large. Further, transmitting digital video information over communication networks can consume large amounts of bandwidth. The cost of transmitting data from one location to another is a function of number of bits transmitted per second. Typically, higher bit transfer rates are associated with increased cost. Higher bit rates can also progressively add to required storage capacities of memory systems, thereby increasing storage cost. Thus, at a given quality level, it can be much more cost effective to use fewer bits, as opposed to more bits, to store digital images and videos. It therefore can be desirable to compress media data for recording, transmitting, or storing.

For a typical compression scheme, achieving higher media quality requires more bits used, which can, in turn, increase cost of transmission and storage. While lower bandwidth traffic can be desired so may higher quality media.

An encoder is a device capable of encoding (e.g., coding) (and sometimes decoding) digital media data. A decoder is a device capable of decoding digital media data. A codec is a device capable of coding and/or decoding digital media data. The term codec is derived from a combination of the terms code and decode, or the terms compress and decompress. A variety of codecs are commercially available. Generally speaking, for example, codec classifications include discrete cosine transfer codecs, fractal codecs, and wavelet codecs. An encoder or codec, by encoding the digital media data, can reduce the number of bits required to transmit signals thereby reducing associated transmission costs.

One part of the encoding process typically involves using motion estimation to facilitate encoding of digital media data. In most cases, consecutive video frames in a sequence of video frames will be relatively similar except for the movement of an object(s) within a frame from one video frame to the next video frame. Motion estimation techniques take advantage of similarities between consecutive video frames to more efficiently encode a video frame. For instance, an encoder, employing a motion estimation technique, can use a previous video frame as a reference when encoding a current video frame. The encoder generates motion vectors for the current video frame based on the previous video frame, which can be a reconstructed video frame. The encoder identifies differences between the reference video frame and current video frame, and codes the portions of the current video frame that are different from the reference video frame, without having to code the portions of the current video frame that are unchanged from the reference video frame. This can thereby make the encoding process and decoding process more efficient.

However, motion estimation is one of the most computing intensive parts of the video encoding process. The better the motion vector, the more the bit rate can be reduced and the more visual quality can be improved. While identifying the best motion vector can reduce the bit rate and improve visual quality, identifying the best motion vector can cost significant computing power.

Further, while it is desirable to obtain the best compression quality when encoding video to obtain the best visual quality, in real-time video encoding, there is only a finite amount of time to process (e.g., encode) each video frame or slice. Conventional encoding systems may not effectively achieve good compression quality for video while meeting real-time processing requirements.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems and methods disclosed herein relate to encoding video. A coder component is configured to encode a raw video frame of a sequence of raw video frames of a video. A coder management component is configured to control encoding of the raw video frame and identify a refinement mode from a plurality of refinement modes, in accordance with at least one predefined encoding criterion, to facilitate the encoding of at least a portion of the raw video frame within a predefined target period of time.

Also disclosed herein is a method including employing at least one processor to facilitate execution of code instructions retained in a memory device. The code instructions, in response to execution, perform acts comprising: generating an initial motion estimation of a raw video frame of a sequence of video frames, based at least in part on a previous video frame; and identifying a mode of refinement motion search from a plurality of modes of refinement motion search, in accordance with at least one predefined encoding criterion, to facilitate encoding of at least a portion of the raw video frame within a target total period of time.

Also disclosed herein is a system for encoding of a raw video frame within a target finish time. The system includes means for identifying the target finish time to code the raw video frame. The system also includes means for dividing the raw video frame into a plurality of segments. The system further includes generating an initial motion estimation for an individual segment of the plurality of segments. The system also includes selecting a refinement mode from a plurality of refinement modes to refine the initial motion estimation, wherein the means for selecting the refinement mode compares an estimated time to refine the initial motion estimation using the refinement mode with a predefined time allocated to code the individual segment and selects the refinement mode if the estimated time is less than the time allocated.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Figure 1:
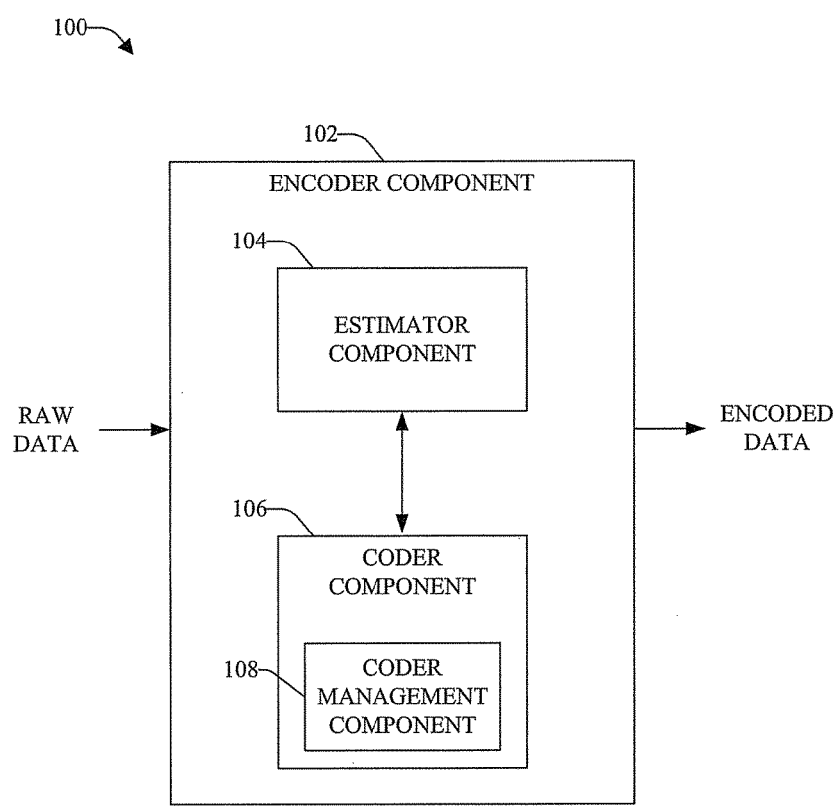
FIG. 1 illustrates a block diagram of an example system that can efficiently encode digital media data in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Video encoding is typically used to compress video, comprising a sequence of video frames, for transmission, viewing, and/or storage. Generally the better the compression quality, the better the video quality is when the video is reproduced (e.g., decoded) for viewing and the more efficient the video transmission can be. As part of the encoding process, motion estimation is typically used to facilitate encoding digital media data. During the motion estimation process, motion vectors for a current raw video frame of a video frame sequence can be generated based on a reference video frame, which is typically a prior video frame in the sequence. Identifying the best motion vector can be useful to reduce bit rate and improve video quality. A best motion vector can be, for example, a motion vector that can produce the lowest bit rate for coding blocks of a video frame. Typically there can be a number of factors involved in identifying the best motion vector. For example, residual data and/or the motion vector itself (e.g., motion vector difference) can be factors used to facilitate identifying the best motion vector. Generally, the smaller residual data is, the lower the bit rate, and the smaller the motion estimation difference is, the lower the bit rate. For residual data, the bit rate can be calculated, for example, by using a mean-square type algorithm or other desired algorithm. In some instances, the best motion vector can be selected as the motion vector having the smallest residual data. In certain other instances, the best motion vector can be selected as the motion vector having, for example, the smallest motion estimation difference.

Motion estimation can be one of if not the most computing intensive part of a video encoding process. As a result, while identifying the best motion vector can reduce bit rate and improve video quality, this also can result in a high cost with regard to the amount of computing power needed to identify the best motion vector.

Further, while it is desirable to obtain the best compression quality when encoding video to obtain the best visual quality, in real-time video encoding, there is only a finite amount of time to process (e.g., encode) each video frame or slice in order to meet real-time video encoding requirements. Conventional encoding systems may not effectively achieve good compression quality for video while meeting real-time processing requirements.

To that end, techniques for efficient coding of digital media data are presented. In accordance with various aspects, a resource controller component can dynamically allocate computing resources (e.g., processors) between an estimator component and a coder component based at least in part on the total available computing resources, media content complexity, statistical information relating to previously encoded data, one or more predefined encoding criterion, and/or other factors (e.g., encoding-related factors). The video processing system can include a plurality of processors (e.g., processing units), and the resource controller component can assign a subset of the processors to the estimator component and another subset of the processors to the coder component to facilitate parallel processing of the digital media data (e.g., video frames) to efficiently encode such data.

The estimator component can generate an initial motion estimation of a raw video frame of a sequence of raw video frames of a video based at least in part on a previous raw video frame, which can be used as a reference video frame. The coder component can encode the previous raw video frame to generate a reconstructed video frame in parallel with the generation or performance of the initial motion estimation by the estimator component.

When the previous raw video frame is reconstructed to generate a reconstructed previous video frame, the coder component can determine (e.g., dynamically or automatically) whether and/or how to refine the motion estimation to encode the raw video frame based at least in part on various encoding-related information or factors. The encoding-related information or factors can include, for example, available bandwidth, available computing cycles, available amount of time to refine the motion estimation, available modes of motion estimation refinement, statistical information relating to previously encoded video frames, at least one predefined encoding criterion, and/or other information or factors.

The coder component can include a coder management component that can manage (e.g., dynamically or automatically) available coding time to refine an initial motion estimation of and/or encode of a raw video frame, in accordance with at least one predefined encoding criterion (e.g., relating to and/or based at least in part on the encoding-related information or factors), to provide better compression quality (e.g., the best compression quality possible) for the video frame while meeting real-time encoding requirements. The coder management component can divide the raw video frame into a plurality of raw video frame segments. For each raw video frame segment, the coder management component can assign each segment a respective targeted finish time for refining the initial motion estimation and/or encoding of the segment based at least in part on real-time video encoding requirements.

In accordance with various aspects, there can be a plurality of refinement modes (e.g., no refinement mode for encoding with no refinement of the initial motion estimation, full-pixel refinement mode for refining the initial motion estimation to full pixel when encoding, half-pixel refinement mode for refining the motion estimation to half pixel when encoding, quarter-pixel refinement mode for refining the motion estimation to quarter pixel when encoding, etc.), which the coder component can have available use to refine the initial motion estimation of the raw video frame segment and/or encode the segment.

For each segment, the coder management component can identify and select (e.g., dynamically or automatically) a refinement mode from the plurality of available refinement modes (e.g., a plurality of available modes of refinement motion search) to be used to refine the initial motion estimation of and/or encode the raw video frame segment of the raw video frame to provide (e.g., generate and output) an encoded video frame having desired (e.g., the best or optimal) compression quality within the target finish time applicable for that segment, in accordance with a predefined encoding algorithm. For each segment, the coder component can refine the initial motion estimation of and/or encode the video segment using the selected refinement mode. When the initial motion estimation is to be refined (e.g., to full pixel, half pixel, quarter pixel, etc.) for a video segment of the raw video frame, the coder component can refine the initial motion estimation of the video segment using the reconstructed previous frame as a reference frame.

Referring now to the drawings, FIG. 1 illustrates a block diagram of an example system 100 that can efficiently encode digital media data in accordance with various aspects and implementations described herein. The system 100 can include an encoder component 102 that can encode received digital media data (e.g., digital video content, audio content, still image, multimedia content, etc.) to produce encoded digital media data as an output. The encoder component 102 can encode or compress the digital media data in accordance with a predefined compression or encoding algorithm(s).

In an exemplary embodiment, the encoder component 102 uses and dynamically manages multi-stage motion estimation to encode the digital media data. The encoder component 102 can manage the multi-stage motion estimation of raw video frames of a video in parallel to more efficiently use computing power (e.g., more efficiently use parallel data processing) to achieve more efficient (e.g., optimal) compression quality in real-time processing of video, for example.

As part of the encoding process, the encoder component 102 can generate an initial motion estimation for a raw video frame of video frame sequence based at least in part on a previous raw video frame. The encoder component 102 can determine whether and/or how to refine the initial motion estimation for the raw video frame to facilitate encoding the raw video frame. As more fully disclosed herein, the encoder component 102 can manage (e.g., dynamically or automatically) encoding time for encoding the raw video frame to achieve desirable (e.g., optimal, more efficient, higher) compression quality for the raw video frame while also meeting applicable target time periods for encoding the raw video frame in order to meet applicable real-time processing requirements. For instance, the encoder component 102 can use respective modes of a plurality of available modes of motion estimation refinement to refine the initial motion estimation for respective segments of the raw video frame to achieve desirable compression quality for the raw video frame while also meeting respective applicable target time periods for encoding respective segments of the raw video frame to encode and present the video in real-time. In accordance with various implementations, the encoder component 102 can be a stand-alone unit, part of a codec, part of another component or unit, or can have portions of the encoder component 102 distributed in multiple components or units of the system 100.

The encoder component 102 can include an estimator component 104 that can generate or perform an initial motion estimation of a raw video frame (e.g., raw video frame$_N$) of a sequence of raw video frames (e.g., raw video frame$_1$, . . . , raw video frame$_{N-2}$, raw video frame$_{N-1}$, raw video frame$_N$, raw video frame$_{N+1}$, raw video frame$_{N+2}$, . . . ) of video content based at least in part on a previous raw video frame (e.g., raw video frame$_{N-1}$) of the sequence. For instance, the estimator component 104 can generate the initial motion estimation of the raw video frame by processing subsets of raw data respectively associated with the raw video frame and the previous raw video frame (e.g., being used as a reference frame).

As part of the initial motion estimation, the estimator component 104 can generate a subset of motion vectors associated with the raw video frame (e.g., raw video frame$_N$). The estimator component 104 can use the previous raw video frame as a reference video frame, in relation to the raw video frame, when generating the initial motion estimation for the raw video frame. In some implementations, during encoding of the first raw video frame (e.g., raw video frame$_1$ when N=1) of the sequence, since there is no previous video frame, the encoder component 102 can encode the first raw video frame without performing motion estimation of the first raw video frame.

The encoder component 102 can include a coder component 106 that can encode the previous raw video frame (e.g., raw video frame$_{N-1}$). As part of the encoding process, the coder component 106 also can generate a reconstructed video frame (e.g., reconstructed video frame$_{N-1}$). The encoding of the previous raw video frame (e.g., copy of the previous raw video frame) by the coder component 106 can be performed in parallel (e.g., simultaneously, substantially simultaneously, concurrently, etc.) with the generation of the initial motion estimation by the estimator component 104.

In some implementations, as more fully disclosed herein, a plurality of processors (e.g., processing units) can be employed to process data and facilitate parallel processing of data. A first subset of the plurality of processors can be allocated to the estimator component 104, and a second subset of processors can be allocated to the coder component 106, to facilitate parallel operation and performance of the respective functions by the estimator component 104 and coder component 106. Depending in part on the number of available processors assigned to the estimator component 104, the estimator component 104 can generate or perform one initial motion estimation on a raw video frame at a time or multiple initial motion estimations on respective multiple raw video frames in parallel (e.g., simultaneously, substantially simultaneously, or concurrently).

The estimator component 104 can generate or perform an initial motion estimation on a single slice (e.g., using a single core and/or processor) associated with a raw video frame at a given time or multiple initial motion estimations on respective multiple slices (e.g., using multiple cores and/or multiple processors) in parallel. Depending in part on the number of available processors assigned to the coder component 106, the coder component 106 can encode one raw video frame (and/or refine a motion estimation of a raw video frame) at a given time or can encode multiple raw video frames (and/or refine multiple motion estimations of respective raw video frames) in parallel.

As part of the encoding process, the coder component 106 can encode the previous raw video frame to generate an encoded previous video frame (e.g., a coded bitstream for the previous video frame). The coder component 106 also can decode the encoded previous video frame to reconstruct the previous video frame to thereby generate a reconstructed previous video frame. In some instances (e.g., when motion estimation is to be refined), the coder component 106 can use the reconstructed previous video frame as a reference video frame when encoding the raw video frame (e.g., raw video frame$_N$). The coder component 106 can use the initial motion estimation without refinement, or can use the reconstructed previous video frame to refine motion estimation of the raw video frame. The coder component 106 can use the initial motion estimation or refined motion estimation to encode the raw video frame, as more fully disclosed herein.

Before, during or after the coder component 106 reconstructs the previous raw video frame to generate the reconstructed previous video frame, the coder component 106 can receive (e.g., obtain) the raw video frame (e.g., from the estimator component 104) and a subset of initial motion vectors generated during the initial motion estimation of the raw video frame by the estimator component 104. In accordance with various aspects, after the coder component 106 reconstructs the previous raw video frame to generate the reconstructed previous video frame, the coder component 106 can begin to encode the raw video frame.

In accordance with other aspects, if the coder component 106 determines that no refinement is to be performed on the initial motion estimation for the raw video frame, or portion (e.g., video segment) thereof, prior to the previous raw video frame being reconstructed, and computing resources (e.g., multiple processors with available computing cycles) are available to finish reconstructing the previous raw video frame in parallel with encoding the raw video frame using the initial motion estimation without refinement, the coder component 106 can continue reconstructing the previous raw video frame in parallel with encoding the raw video frame, or portion thereof, using the initial motion estimation without refinement and the portion(s) (e.g., frame slice(s)) of the previous raw video frame (e.g., partitioned previous raw video frame) that has been reconstructed, if the previous raw video frame had been partitioned into slices.

There may be some constraints involved due to the previous raw frame still having a slice(s) that has not yet been reconstructed. For instance, there may be some constraints on a motion vector(s), wherein, for example, a block(s) in one frame slice may not be able to reference to a block(s) in another frame slice of the previous raw video frame when that other frame slice has not been reconstructed yet.

In accordance with various aspects, the coder component 106 can include a coder management component 108 that can manage (e.g., dynamically or automatically) available coding time to refine an initial motion estimation of and/or encode of a raw video frame, in accordance with at least one predefined encoding criterion, to provide better compression quality (e.g., the best compression quality possible) for the video frame while meeting real-time encoding requirements. The coder management component 108 can automatically and/or dynamically determine whether and/or how to refine the motion estimation (e.g., initial motion estimation) of the raw video frame to encode the raw video frame based at least in part on various encoding-related information or factors, including, available bandwidth, available computing cycles, available amount of time to refine the motion estimation or encode the raw video frame (e.g., to meet real-time encoding requirements), available modes of motion estimation refinement, statistical information relating to previously encoded video frames or slices, at least one predefined encoding criterion, and/or other information or factors.

The coder management component 108 can use a predefined encoding algorithm(s), which can be structured in accordance with the at least one predefined encoding criterion. A predefined encoding algorithm can take into account encoding criteria relating to the various encoding-related information (e.g., refinement-related information or factors), including respectively weighting or balancing respective criterion relating to encoding-related factors, taking into account respective threshold values of respective encoding criterion, etc.

The coder management component 108 can analyze or evaluate information relating to motion estimation refinement for the raw video frame and can apply a predefined encoding algorithm to the information or associated analysis (e.g., interim analysis results) to obtain analysis results. The coder management component 108 can use the analysis results to determine whether and/or how to refine the motion estimation for the raw video frame, and/or how to use the initial motion vectors, when encoding the raw video frame. For instance, the coder management component 108 can use the analysis results relating to a segment of the raw video frame to identify or determine which mode of the plurality of available modes for motion estimation refinement is to be selected and used to refine (or not refine) the initial motion estimation of the video segment and encode the video segment.

In some implementations, the plurality of available motion estimation refinement modes (e.g., a plurality of modes of refinement motion search) can include a first refinement mode, a second refinement mode, a third refinement mode, and/or a fourth refinement mode. The first refinement mode can be, for example, a no refinement mode, where the motion estimation (e.g., and associated initial motion vectors) for a segment of the raw video frame is not refined from the initial motion estimation when encoding that segment. The second refinement mode can be, for example, a full-pixel refinement mode, where the initial motion estimation of the segment of the raw video frame can be refined from the initial motion estimation to a full-pixel level of granularity, based at least in part on the reconstructed previous video frame, when encoding that segment. The third refinement mode can be, for example, a half-pixel refinement mode (e.g., mode to refine the segment to half pixel), where the initial motion estimation of the segment of the raw video frame can be refined from the initial motion estimation to a half-pixel level of granularity, based at least in part on the reconstructed previous video frame, when encoding that segment. The fourth refinement mode can be, for example, a quarter-pixel refinement mode (e.g., mode to refine the segment to a quarter pixel), where the initial motion estimation of the segment of the raw video frame can be refined from the initial motion estimation to a quarter-pixel level of granularity, based at least in part on the reconstructed previous video frame, when encoding that video segment.

The quarter-pixel refinement mode can provide better (e.g., higher) compression quality than that of the half-pixel refinement mode. The half-pixel refinement mode can provide better compression quality than that of the full-pixel refinement mode. The full-pixel refinement mode can provide better compression quality than that of the no refinement mode. Better compression quality typically can provide better video reproduction quality and can facilitate more efficient transmission or storage of video.

Each of the respective modes of motion estimation refinement can involve respective amounts (e.g., predicted amounts) of coding time. For example, the no refinement mode can be predicted to use an amount of coding time (e.g., te[rme1]) that is less than or equal to the amount of coding time (e.g., te[rme2]) that can be predicted to be used when employing the full-pixel refinement mode to refine the initial motion estimation of and/or encode a video segment of the raw video frame (e.g., te[rme1]≤te[rme2]). The full-pixel refinement mode can be predicted to use an amount of coding time (e.g., te[rme2]) that is less than or equal to the amount of coding time (e.g., te[rme3]) that can be predicted to be used when employing the half-pixel refinement mode to refine the initial motion estimation of and/or encode the video segment (e.g., te[rme2]≤te[rme3]). The half-pixel refinement mode can be predicted to use an amount of coding time (e.g., te[rme3]) that is less than or equal to the amount of coding time (e.g., te[rme4]) that can be predicted to be used when employing the quarter-pixel refinement mode to refine the initial motion estimation of and/or encode the video segment (e.g., te[rme3]≤te[rme4]).

It is to be appreciated and understood that, while this disclosure describes these four modes of motion estimation refinement, this disclosure is not so limited. In accordance with various implementations, there also can be less than four modes of motion estimation refinement, more than four modes of motion estimation refinement, and/or different modes of motion estimation refinement.

Also, while this disclosure includes implementations relating to refinement of an initial motion estimation for a raw video frame, or portion thereof, based at least in part on a pixel level, this disclosure is not so limited to only this dimension. In accordance with other implementations, additionally and/or alternatively, the encoder component 102 (e.g., using the coder management component 108) can make determinations regarding refinement of an initial motion estimation for a raw video frame based at least in part on a pixel-level dimension and/or one or more other dimensions, such as, for example, the search range for refinement of the initial motion estimation of the raw video frame, or portion thereof. For example, the encoder component 102 (e.g., using the coder management component 108) can use a predefined encoding algorithm, based at least in part on predefined encoding criteria relating to two or more encoding-related dimensions (e.g., the pixel level and search range for refinement of the initial motion estimation), to refine an initial motion estimation for the raw video frame, or portion thereof, and encode the raw video frame.

As part of refining an initial motion estimation of and/or encoding the raw video frame (e.g., in real time), the coder management component 108 can divide (e.g., separate, partition) the raw video frame (e.g., raw data of the raw video frame) into a plurality of segments (e.g., a plurality of subsets of raw data respectively associated with respective segments of the raw video frame). For example, the coder management component 108 can equally divide a raw video frame into a plurality of segments, divide a raw video frame into a plurality of segments based at least in part on respective types of data of the respective segments, or divide a raw video frame into a plurality of segments based at least in part on respective content or complexity of the respective segments of the raw video frame.

The coder management component 108 can identify a total target time for coding the raw video frame. The coder management component 108 can identify and/or assign (e.g., dynamically or automatically) respective amounts of target time (e.g., target finish time) for refining an initial motion estimation for and/or coding each video segment of the raw video frame. In some implementations, the coder management component 108 can identify a target time for a segment (e.g., next segment) of the raw video frame as a function of an actual amount of time to encode a previously encoded segment of the raw video frame and the total target time (e.g., total remaining target time) available for encoding the raw video frame, as more fully disclosed herein. For instance, when coding a next video segment, segment [i+1], the target finish time, target_time, to code the next video segment can be calculated as target_time=[i+1]−tf[i]. In some implementations, t[i+1] can be the targeted finishing timeline nominally available to code the next video segment, and tf[i] can be the actual (e.g., real) finishing timeline to code the previous video segment(s) of the raw video frame. In other implementations, t[i+1] can be the amount of time nominally available to code all video segments (e.g., segment [1], segment [2], . . . , segment [i], segment [i+1]), and tf[i] can be the actual (e.g., real) amount of time used to code the previous video segment(s) (e.g., segment [1], segment [2], . . . , segment [i]) of the raw video frame.

For a video segment, the coder management component 108 can select the refinement mode from the plurality of available refinement modes that provides better (e.g., the best or highest available) compression quality while also enabling the motion estimation refining and/or coding for the video segment to be completed within the identified target time for the segment in order to meet the applicable real-time encoding requirements.

In accordance with a non-limiting example, the coder management component 108 can divide a raw video frame into four segments, which can be indexed as segment [1], segment [2], segment [3], and segment [4]. The coder management component 108 can assign a target finish time for refining the initial motion estimation of and/or encoding the segments of the raw video frame. For example, for each segment [i], a respective target finish time t[i] for i=1, 2, 3, and 4 can be assigned. If there are more than 4 segments, i can be an integer number representative of the number of segments. As disclosed herein, each motion estimation refinement mode can have a respective predicted coding time for coding a video segment. The respective predicted coding times for the 4 refinement modes can be, for example, te[rme1], te[rme2], te[rme3], te[rme4], wherein te[rme1]≤te[rme2]≤te[rme3]≤te[rme4].

The coder management component 108 can apply or use a predefined encoding algorithm that can facilitate identifying and selecting an appropriate refinement mode to obtain better (e.g., the best or highest available) compression quality while meeting real-time coding requirements.

One type, of predefined encoding algorithm is illustrated in this non-limiting example. For the first video segment, segment [1], the coder management component 108 can identify a motion estimation refinement mode that can provide the best compression quality while still enabling the coder component 106 to refine the initial motion estimation and/or code the first video segment within the target finish time t[1]. The target finish time t[1] can be the entire target finish time, since no time has been spent on coding the raw video frame yet. The coder management component 108 can determine whether the predicted coding time for the no refinement mode, te[rme1], is greater than the target finish time t[1]. If the predicted coding time for the no refinement mode, te[rme1], is greater than the target finish time t[1] (i.e., te[rme1]>t[1]), the coder management component 108 can select the no refinement mode (e.g., first refinement mode, rme1) as the refinement mode to be used to code the first video segment. This is because the amount of time to code the first segment using the no refinement mode already exceeds the target finish time applicable for the first video segment, and, compared to the other available refinement modes, the no refinement mode uses the least amount of time when coding a video segment. The coder component 106 can code the first video segment without refining the initial motion estimation for the first video segment.

If the coder management component 108 determines the predicted coding time for the no refinement mode, te[rme1], is not greater than the target finish time t[1] (i.e., t[1]>te[rme1]), the coder management component 108 can determine whether the predicted coding time for the quarter-pixel refinement mode, te[rme4], is less than the target finish time t[1], the coder management component 108 can select the quarter-pixel refinement mode, te[rme4], to code the first video segment. The coder component 106 can code the first video segment by refining the initial motion estimation for the first video segment to a quarter-pixel level of granularity, based at least in part on the reconstructed previous video frame, and perform the remainder of the coding of the first video segment.

If the coder management component 108 determines the predicted coding time for the quarter-pixel refinement mode, te[rme4], is not less than the target finish time t[1] (i.e., te[rme1]>t[1]), the coder management component 108 can select a refinement mode, rmei, that has a predicted coding time, te[rmei], less than or equal to the applicable target finish time t[1] and a predicted coding time, te[rmej], (e.g., predicted coding time of the next highest refinement mode) that is greater than the target finish time, t[1], where j=i+1. In this example, the coder management component 108, applying this part of this predefined encoding algorithm, can select the full-pixel refinement mode or half-pixel refinement mode based at least in part on the determination of which of those refinement modes satisfies the conditions described above. For instance, if the coder management component 108 determines the predicted coding time, te[rme2], for full-pixel refinement mode, rme2, of the first video segment is less than or equal to the target finish time t[1], and the predicted coding time, te[rme3], for half-pixel refinement mode, rme3, of the first video segment is greater than the target finish time t[1], the coder management component 108 can select the full-pixel refinement mode to code the first video segment.

If those algorithmic conditions are not met with regard to the full-pixel refinement mode, the coder management component 108 can evaluate the next higher available refinement mode (e.g., the half-pixel refinement mode, rme3) to determine whether such refinement mode satisfies the algorithmic conditions of the predefined encoding algorithm. It is noted that in this example, since there are 4 refinement modes available, if the coder management component 108 has eliminated the first, second and fourth refinement modes already as options for encoding the first video segment, the third refinement mode, rme3, will be the only one that is still available and it can be selected by default by the coder management component 108. However, in some implementations, there can be more than four available refinement modes, and in such instances, the coder management component 108 can continue to evaluate the next highest refinement mode to identify the refinement mode that satisfies the conditions of this predefined encoding algorithm.

The coder component 106 can code the first video segment using the selected refinement mode. When the coding of the first video segment is completed, the coder management component 108 can identify the actual (e.g., real) finish time (e.g., tf[i], with i=1 at this point) used to code the first video segment. The coder management component 108 can calculate the remaining amount of coding time as being equal to t[i+1]−tf[i], where the remaining amount of coding time can be the target finish time, target_time, to code the next video segment (e.g., segment [i+1], which is segment [2] at this point).

The coder management component 108 can dynamically manage the coding of the next video segment to determine whether to select the no refinement mode, determine whether to select the quarter-pixel refinement mode (e.g., if the algorithmic condition(s) for selecting the no refinement mode is not satisfied), and/or determine whether to select the full-pixel refinement mode or half-pixel refinement mode (e.g., if the algorithmic conditions for selecting either the no refinement mode or quarter-pixel refinement mode are not satisfied), in accordance with this predefined encoding algorithm. The coder management component 108 can continue managing coding of the video segments of the raw video frame until coding of the raw video frame is complete.

In accordance with other implementations, the coder management component 108 can apply or use a different predefined encoding algorithm to dynamically manage coding time to code the raw video frame to have better compression quality (e.g., the best compression quality possible) while meeting the real-time encoding requirements, in accordance with the at least one predefined encoding criterion.

The coder management component 108 can segment the target finish time for coding the raw video frame as a function of the number of video segments of the raw video frame. For example, the coder management component 108 can divide a raw video frame into 4 equal video segments and can divide a total target finish time for coding the raw video frame into 4 equal time segments, which can be assigned to the 4 video segments, respectively. In some implementations, when a video segment of a raw video frame has been coded, the coder management component 108 can dynamically re-allocate coding time (e.g., remaining coding time) among the remaining video segments of the raw video frame to be coded, whether coding of the prior video segment took more or less than the target finish time applicable to the prior video segment. For example, if the coding of a video segment took less time than the allocated amount of time in the time segment, the coder management component 108 can dynamically re-allocate any remaining time after the coding of that video segment to any remaining time segments associated with video segments that remain to be coded.

The coder management component 108 can identify a total target amount of time (e.g., target finish time) available to refine an initial motion estimation of and/or encode the raw video frame (e.g., in accordance with real-time encoding requirements). The coder management component 108 can divide the raw video frame into a specified number of video segments. The coder management component 108 also can divide the total target amount of time into respective time segments (e.g., amounts, periods, intervals, etc.) based at least in part on the number of video segments of the raw video frame, and/or assign respective time segments of the total amount of target time to respective video segments, to facilitate refining an initial motion estimation for and/or encoding each video segment of the raw video frame, as more fully disclosed herein.

For a video segment having a corresponding time segment in which to be encoded, the coder management component 108 can evaluate the respective available refinement modes to identify a refinement mode that is the highest mode of refinement (e.g., provides the best available compression quality) that can be used to code the video segment while being predicted to be completed within the time available from the associated time segment. For instance, the coder management component 108 can determine whether to select the no refinement mode such that it selects the no refinement mode to code the video segment if the predicted coding time, te[rme1] for that mode is greater than the applicable target finish time, which can be the time length of the time segment allocated to the video segment.

If it is determined that the predicted coding time, te[rme1], for that mode is not greater than the applicable target finish time, the coder management component 108 can determine whether to select another refinement mode, e.g., the quarter-pixel refinement mode. The coder management component 108 can select the quarter-pixel refinement mode to code the video segment if the predicted coding time, te[rme4], for that mode is less than or equal to the applicable target finish time (e.g., time segment). If it is determined that the predicted coding time, te[rme4], for that mode is greater than the applicable target finish time, the coder management component 108 can determine whether to select the full-pixel refinement mode or half-pixel refinement mode such that it selects the highest refinement mode that has a predicted coding time that is less than or equal to the applicable target finish time (e.g., time segment).

After refining the initial motion estimation of and/or encoding the video segment, the coder management component 108 can identify whether there was any time remaining in the applicable time segment for that video segment. If there was time remaining, the coder management component 108 can dynamically re-allocate (e.g., dynamically or automatically re-assign, re-distribute, etc.) that remaining coding time to respective time segments associated with video segments of the raw video frame that remain to be coded, in accordance with the different predefined encoding algorithm. For example, the coder management component 108 can re-allocate the remaining coding time equally among the time segments associated with the remaining video segments to be coded, or can re-allocate the remaining coding time based at least in part on one or more encoding-related factors (e.g., respective complexity of media content of the raw video frame segments, respective residual data energy associated with the video segments as obtained from the initial motion estimation, available computing resources, statistical information relating to previously encoded data, at least one predefined encoding criterion, etc.).

In accordance with still other implementations, depending in part on the amount of computing resources allocated to the coder component 106, the coder management component 108 can manage coding of video segments of a raw video frame, including allocation of coding time to code the respective video segments, to have the coder component 106 refine the initial motion estimation of and/or code video segments in parallel. This often can allow the coder management component 108 to select more optimal refinement modes (e.g., refinement mode providing better compression quality) since video segments are being coded in parallel. As a result, the quality of the video encoding can be further improved. The disclosed encoding algorithms can be modified, as desired, to take into account parallel coding of video segments of a raw video frame.

In accordance with various aspects, the coder management component 108 can dynamically determine or identify the predicted coding time for a particular refinement mode and/or there can be a predefined, initial or default predicted coding time for the particular refinement mode. The predicted coding time can be derived (e.g., by the coder management component 108) based at least in part on statistics relating to coding times for previous coding of segments associated with that refinement mode. The statistics can be based at least in part on one or more encoding-related factors, which can relate to quantization levels, residual data, block types in the video segment, segment position in the coding unit (e.g., block, macroblock), etc., associated with the refinement mode or video segment to be encoded. The statistics can be based at least in part on offline experiments relating to encoding video, prior knowledge, default values, etc.

The coder management component 108 can dynamically update the statistics relating to coding times. For instance, when the coder component 106 finishes coding a video segment, the coder management component 108 can collect statistical information, such as the real amount of coding time type of refinement mode, quantization level(s), residual data, block types in the video segment, segment position in the coding unit, and/or other information relating to the coding of the video segment, and can add this statistical information to corresponding statistics (e.g., stored by the coder management component 108) to update the statistics. The coder management component 108 can dynamically update, adjust or recalculate a predicted coding time associated with a refinement mode based at least in part on the updated statistics.

The coder management component 108 can derive or calculate (e.g., dynamically or automatically) a predicted coding time for a refinement mode based at least in part on encoding-related statistics associated with that refinement mode, in accordance with at least one predefined encoding criterion. In some implementations, the coder management component 108 (or another component) can derive or calculate the predicted coding time for a refinement mode as the median or average amount of coding time to code a video segment using that refinement mode, based at least in part on the encoding-related statistics.

For example, the coder management component 108 can identify a minimum estimated time (or a subset of lower estimated times) and a maximum estimated time (or a subset of higher estimated times) to code a video segment using a particular refinement mode. The coder management component 108 can derive or calculate the average amount of time to code a video segment in that mode as the minimum estimated time plus the maximum estimated time divided by two, or as the sum of each of the lower estimated times of the subset of the lower estimated times plus the sum of each of the higher estimated times of the subset of the higher estimated times divided by the total number of lower estimated times and the higher estimated times. The coder management component 108 also can derive or calculate the median amount of time to code the video segment in that mode as the amount of time where half of the estimated coding times for that mode are above the median amount of time and half of the estimated coding times are below the median amount of time, based at least in part on the encoding-related statistics (or evaluated or sampled portions thereof).

In still other implementations, the coder management component 108 can identify, derive or calculate a maximum estimated time to code a video segment using a particular refinement mode. The coder management component 108 can use this maximum estimated time as the predicted coding time for that particular refinement mode. This typically can be a more conservative predicted coding time than the average or median predicted coding time, but generally can provide more assurance that the coding can be performed in that refinement mode within the target finish time, as compared to an average or a median value for the predicted coding time.

Figure 2:
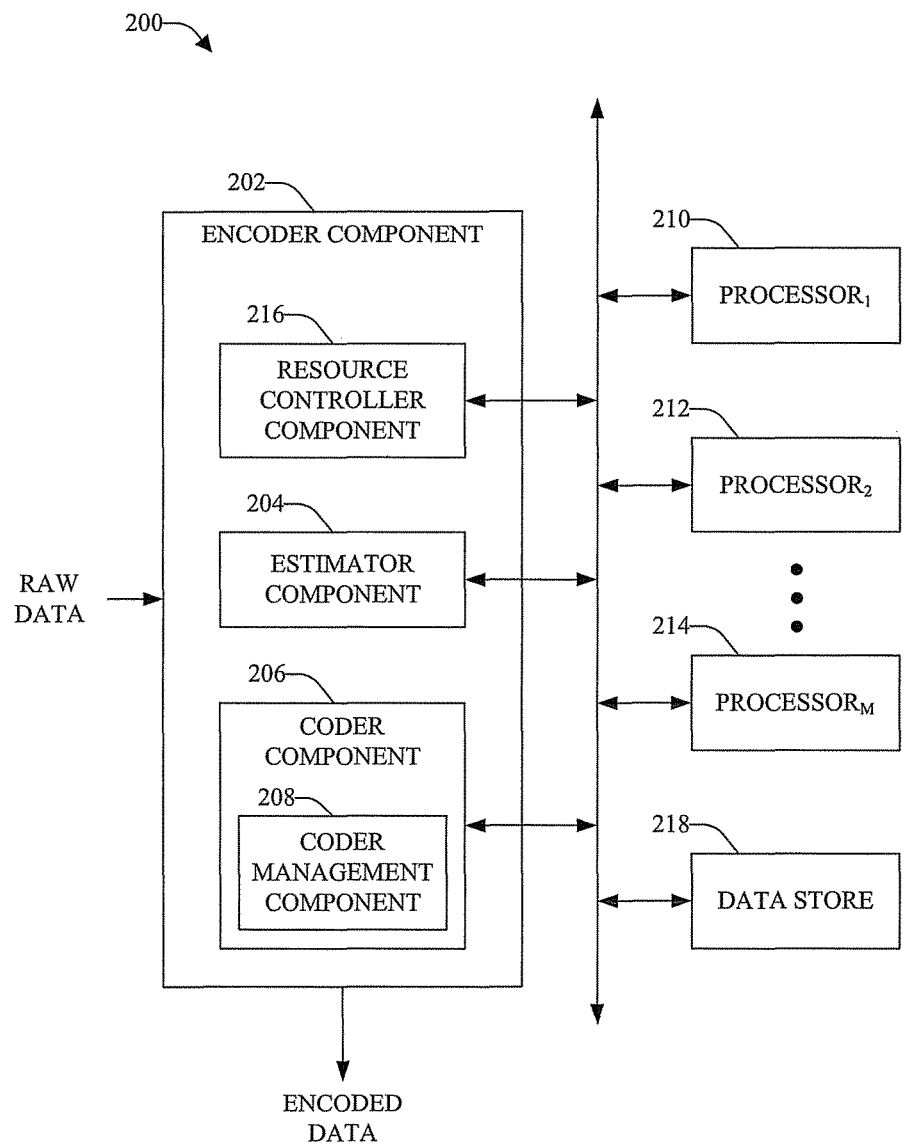
FIG. 2 depicts a block diagram of an example system that can allocate (e.g., dynamically or automatically) system resources to facilitate efficient encoding of digital media data (e.g., video data) in accordance with various aspects and implementations of this disclosure.

FIG. 2 depicts a block diagram of an example system 200 (e.g., video processing system) that can allocate (e.g., dynamically or automatically) system resources to facilitate efficient encoding of digital media data (e.g., video data) in accordance with various aspects and implementations of this disclosure. The system 200 can contain an encoder component 202 that can encode data (e.g., digital media data) associated with content (e.g., video content), as more fully disclosed herein. The encoder component 202 can include an estimator component 204 that can generate or perform at least an initial motion estimation of a raw video frame of a sequence of raw video frames of a video, in accordance with the at least one predefined criterion, as more fully disclosed herein. The encoder component 202 can further include a coder component 206 that can encode the raw video frame.

In some implementations, the coder component 206 can determine (e.g., automatically or dynamically) whether to refine the initial motion estimation of the raw video frame and/or how to use the subset of initial motion vectors of the initial motion estimation when encoding the raw video frame, in accordance with the at least one predefined criterion, as more fully disclosed herein. The coder component 206 can include a coder management component 208 that can manage (e.g., dynamically or automatically) available coding time to refine an initial motion estimation of and/or encode of a raw video frame, in accordance with at least one predefined encoding criterion, to provide better compression quality (e.g., the best compression quality possible) for the video frame while meeting real-time encoding requirements, as more fully disclosed herein.

The system 200 can include a plurality of processors (e.g., processing units), including processor$_1$ 210, and processor$_2$ 212 through processor$_M$ 214, wherein M can be virtually any desired integer number. A processor of the plurality of processors can be a typical applications processor, or an application-specific (e.g., encoding-specific) processor, that can be used to process data, such as video or audio data, to facilitate encoding data or performing other operations (e.g., analyzing data, decoding data, communicating data, etc.) on data.

The encoder component 202 also can contain a resource controller component 216 that can allocate, assign, or distribute (e.g., dynamically or automatically) respective processors of the plurality of processors to the estimator component 204 and coder component 206, respectively, at various times. The resource controller component 216 can analyze information relating to encoding the raw video frames of the video, and can use or apply a predefined resource allocation algorithm in relation to the information to determine an appropriate (e.g., efficient, optimal) apportionment of the processors among the estimator component 204, the coder component 206, or other components associated with the system 200, based at least in part on a set or subset of encoding-related information or factors, including, for example, the total available computing resources, media content complexity, statistical information relating to previously encoded data, at least one predefined encoding criterion, and/or other information or factors.

Based at least in part on the results of the analysis, the resource controller component 216 can dynamically allocate, assign, or distribute a first subset of processors (e.g., processor$_1$ 210 and/or one or more other available processors) of the plurality of processors to the estimator component 204 and a second subset of processors (processor$_2$ 212 and/or one or more other available processors) of the plurality of processors to the coder component 206 to facilitate parallel processing of the digital media data (e.g., video frames) to efficiently encode such data.

The resource controller component 216 can monitor and/or analyze encoding operations relating to encoding the video on a continuous basis, periodic basis (e.g., at predefined time intervals), and/or in response to receiving information regarding operating conditions relating to the encoding operations. Based at least in part on the results of the analysis of the encoding operations and/or historical information relating to video encoding, the resource controller component 216 can dynamically set or modify the respective allocations of processors to the estimator component 204, coder component 206, and/or other components of system 200, in accordance with the at least one predefined encoding criterion.

The resource controller component 216 can analyze information, including encoding-related statistics, relating to encoding a subset of video frames (e.g., raw video frame, previous raw video frame) of the video, to generate analysis results. The analysis results can indicate, for instance, the amount of time the estimator component 204 is expected (e.g., predicted) to take to generate the initial motion estimation for a raw video frame and/or the amount of time the coder component 206 is expected to take to perform remaining coding operations on a previous raw video frame. The resource controller component 216 can allocate (e.g., dynamically or automatically) respective subsets of processors and/or respective amounts of processing resources to the estimator component 204 and the coder component 206 based at least in part on the analysis results.

For example, in one situation, the analysis results may indicate generation of the initial motion estimation for a raw video frame by the estimator component 204 is expected (e.g., predicted) to take less time than the remainder of the coding operations to encode a previous raw frame, which is to be performed by the coder component 206. Based at least in part on these analysis results for that situation and at least one predefined encoding criterion, the resource controller component 216 can determine that a smaller number of processors or a smaller amount of processing resources is to be allocated to the estimator component 204 as compared to the number of processors or amount of processing resources that would have been allocated to the estimator component 204 had the analysis results indicated the initial motion estimation of the raw video frame would be expected to take the same amount of time as, or more time than, the remainder of the coding operations to encode the previous raw frame, which is to be performed by the coder component 206.

A processor (e.g., processor$_1$ 210, and processor$_2$ 212, processor$_M$ 214) can operate in conjunction with the other components (e.g., encoder component 202, estimator component 204, coder component 206, etc.) of the system 200 to facilitate performing the various functions of the system 200. The processor can employ one or more processors, microprocessors, or controllers that can process data, such as information relating to encoding or compressing data, generating an initial motion estimation for a raw video frame, managing coding time, analyzing data, quantizing data, sampling data, selecting data, applying an encoding-related algorithm, etc., information relating to other operations of the system 200, and/or other information, to facilitate operation of the system 200, as more fully disclosed herein, and control data flow between the system 200 and other components (e.g., communication device from which the video is received, communication device to which the encoded video is to be transmitted, etc.) associated with the system 200.

The system 200 can include a data store 218 that can store data structures (e.g., encoding-related data, user data, metadata), code structure(s) (e.g., modules, objects, hashes, classes, procedures) or instructions, information relating to encoding or compressing data (e.g., encoding or compression algorithm(s)), decoding or decompressing data (e.g., decoding or decompression algorithm(s)), generating an initial motion estimation for a raw video frame, managing coding time, analyzing data, quantizing data, sampling data, selecting data, applying an encoding-related algorithm, etc., information relating to other operations of the system 200, and/or other information, to facilitate controlling operations associated with the system 200. One or more processors (e.g., processor$_1$ 210, and processor$_2$ 212, processor$_M$ 214) can be functionally coupled (e.g., through a memory bus) to the data store 218 in order to store and retrieve information desired to operate and/or confer functionality, at least in part, to the components of the system 200 (e.g., encoder component 202, estimator component 204, coder component 206, etc.), and/or substantially any other operational aspects of the system 200.

It is to be appreciated and understood that, while three processors are depicted in FIG. 2, this disclosure is not so limited. In accordance with various implementations, the system 200 can contain less than three processors, three processors, or more than three processors, as desired.

Figure 3:
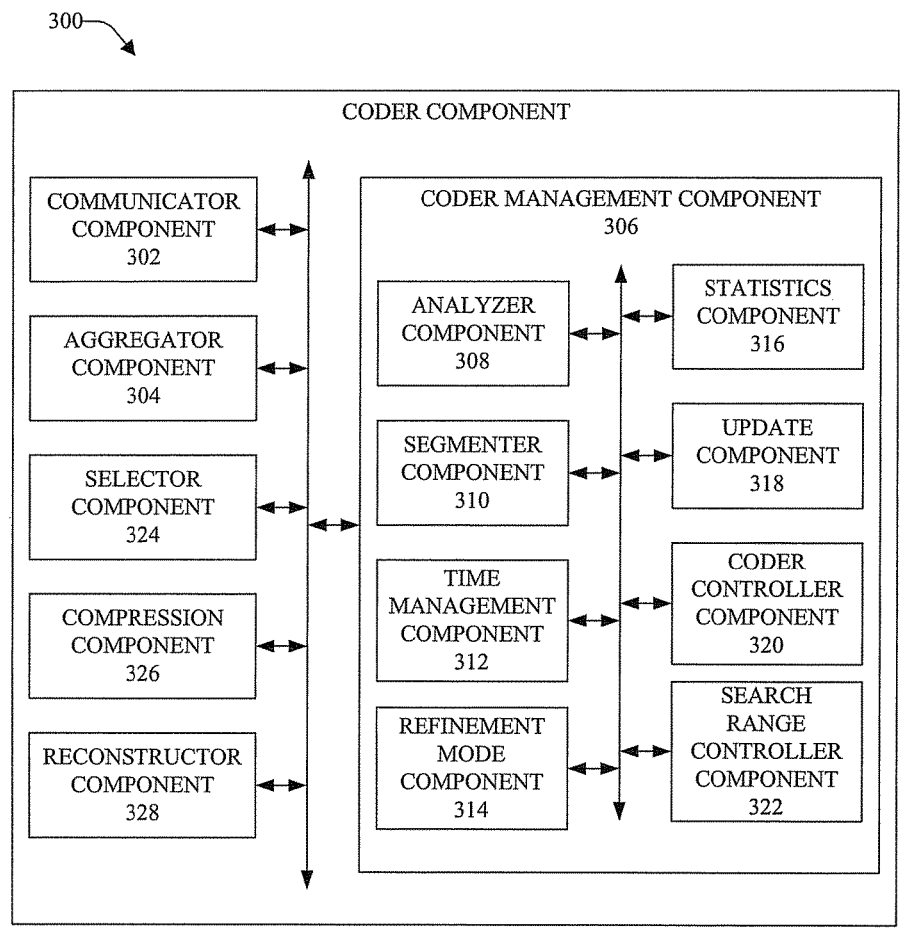
FIG. 3 depicts a block diagram of an example coder component in accordance with various aspects and implementations of this disclosure.

FIG. 3 illustrates a diagram of an example coder component 300 in accordance with various aspects and implementations of this disclosure. The coder component 300 can include a communicator component 302 that can be used to communicate (e.g., transmit, receive) information, including raw video frames of a video (e.g., raw digital media data), encoded video, information that can facilitate encoding data for raw video frames, including refining motion estimations for raw video frames.

The coder component 300 can contain an aggregator component 304 that can aggregate data received (e.g., obtained) from various entities (e.g., processor, data store, estimator component, resource controller component, user interface, etc.). The aggregator component 304 can correlate respective items of data based at least in part on type of data, source of the data, time or date the data was generated or received, encoding state of the data, a video frame to which the data relates, etc., to facilitate analysis of the data (e.g., by an analyzer component).

The coder component 300 can include a coder management component 306 that can manage (e.g., dynamically or automatically) available coding time to refine an initial motion estimation of and/or encode of a raw video frame, in accordance with at least one predefined encoding criterion, to provide better compression quality (e.g., the best compression quality possible) for the video frame while meeting real-time encoding requirements, as more fully disclosed herein. The coder management component 306 can include an analyzer component 308 that can analyze data relating to encoding data, refining motion estimations for raw video frames, managing coding time for coding raw video frames, identifying and selecting the most appropriate refinement mode for coding raw video frame segments, etc. The analyzer component 308 can generate analysis results, based at least in part on the data analysis, to facilitate enabling the coder management component 306 to efficiently manage encoding of the raw video frames and the coding of raw video frames by the coder component 300.

The coder management component 306 can contain a segmenter component 310 that can be used to divide a raw video frame into a plurality of segments (e.g., divide a set of digital media data representing a raw video frame into a plurality of subsets of digital media data representing respective portions of the raw video frame). In some implementations, the segmenter component 310 can segment an amount of coding time (e.g., target finish time, or remaining target finish time) into a plurality of time segments that can be respectively allocated to video segments of a video frame. The coder management component 306 can select a refinement mode for a video segment that provides better (e.g., the best) compression quality (e.g., as compared to another refinement mode(s)), while also meeting the time constraints of the time segment.

The coder management component 306 also can include a time management component 312 that can identify a target finish time to code a raw video frame, identify or calculate a remaining amount of time to code any portion (e.g., video segment) of a raw video frame that remains to be coded, predict an amount of time that it will take to code a video segment, track an amount of time used to code a portion of a raw video frame, identify the actual amount of time used to code a video segment, etc. In some implementations, the time management component 312 can operate in conjunction with the segmenter component 310 to facilitate allocating or re-allocating time to time segments for respective video segments.

The coder management component 306 can include a refinement mode component 314 that can comprise and use a plurality of refinement modes to refine (or not refine) an initial motion estimation of a raw video frame. The plurality of refinement modes can include, for example, a no refinement mode, a full-pixel refinement mode, a half-pixel refinement mode, and a quarter-pixel refinement mode. In some implementations, the refinement mode component 314 can comprise and use additional or alternative types of refinement modes.

The coder management component 306 also can contain a statistics component 316 that can comprise, use, and/or provide statistics relating coding of raw video frames. The statistics component 316 can include or be associated with a data store to store the statistics. The statistics component 316 can operate in conjunction with the aggregator component 304 to aggregate and correlate respective items of information relating to coding of raw video frames.

The coder management component 306 can include an update component 318 that can add statistical data or update the statistics associated with the statistics component 316. The update component 318 can obtain data relating to recently coded raw video frame segments and provide that data to the statistics component 316 to add to or update the statistics associated with the statistics component 316 and/or to the analyzer component 308 for analysis to generate analysis results relating to the obtained data. The analyzer component 308 can provide the analysis results and/or raw statistical data to the statistics component 316 to facilitate updating the statistical information.

The coder component 300 can include a coder controller component 320 that can dynamically identify whether and/or how to refine an initial motion estimation of a raw video frame, based at least in part on various encoding-related factors, the initial motion estimation, and at least one predefined encoding criterion, as more fully disclosed herein. The coder controller component 320 also can control (e.g., dynamically) available coding time to refine (or not refine) an initial motion estimation of and/or encode of a raw video frame, in accordance with at least one predefined encoding criterion, to provide the best or at least better compression quality for the video frame while meeting real-time encoding requirements, as more fully disclosed herein. The coder controller component 320 can operate in conjunction with other components (e.g., analyzer component 308, segmenter component 310, time management component 312, refinement mode component 314, etc.) to facilitate controlling motion estimation refinement and coding of video segments of a raw video frame. The coder controller component 320 also can set or adjust parameters relating to the refinement of a motion estimation for a raw video frame, or portion thereof, to facilitate performance of the motion estimation refinement or other parameters relating to other aspects of coding of a raw video frame, or portion thereof.

The coder management component 306 also can comprise a search range controller component 322, which can operate in conjunction with the coder controller component 320, to dynamically and/or automatically set or adjust (e.g., modify) a search range for motion estimation refinement of a raw video frame, based at least in part on various encoding-related factors, the initial motion estimation (e.g., initial motion vectors of the initial motion estimation), and at least one predefined encoding criterion, as more fully disclosed herein.

In accordance with other aspects, the coder component 300 can contain a selector component 324 that can select items of data, an applicable encoding-related algorithm (e.g., encoding algorithm, motion estimation refinement algorithm, etc.), a macroblock of a raw video frame, statistical information relating to coding of video, a refinement mode, or other information or items, to facilitate encoding data or refining a motion estimation for a raw video frame.

The coder component 300 can include a compression component 326 that can encode or compress data associated with a video frame in accordance with a predefined compression or encoding algorithm. The compression component 326 can use a specified quantization value that can correspond to the compression level to be used during the encoding of the raw video frame. In some implementations, the coder component 300 can contain a reconstructor component 328 that can reconstruct a video frame for use as a reference video frame during refinement of a motion estimation of a next video frame and/or for presentation of the video frame (e.g., to a video viewer). The reconstructor component 328 can reconstruct the video frame (e.g., raw video frame, previous raw video frame, etc.) as part of the coding of the video frame.

The coder component 300 can contain, or can be associated with (e.g., communicatively connected to), one or more processors (not shown in FIG. 3; as depicted in FIG. 2) that can process data relating to encoding data and refining motion estimations for raw video frames, managing coding time, etc., as more fully disclosed herein. The coder component 300 can include, or can be associated with (e.g., communicatively connected to), one or more data stores (not shown in FIG. 3; as depicted in FIG. 2) that can receive, store, and/or provide data relating to encoding data and refining motion estimations for raw video frames, managing coding time, etc., as more fully disclosed herein.

Figure 4:
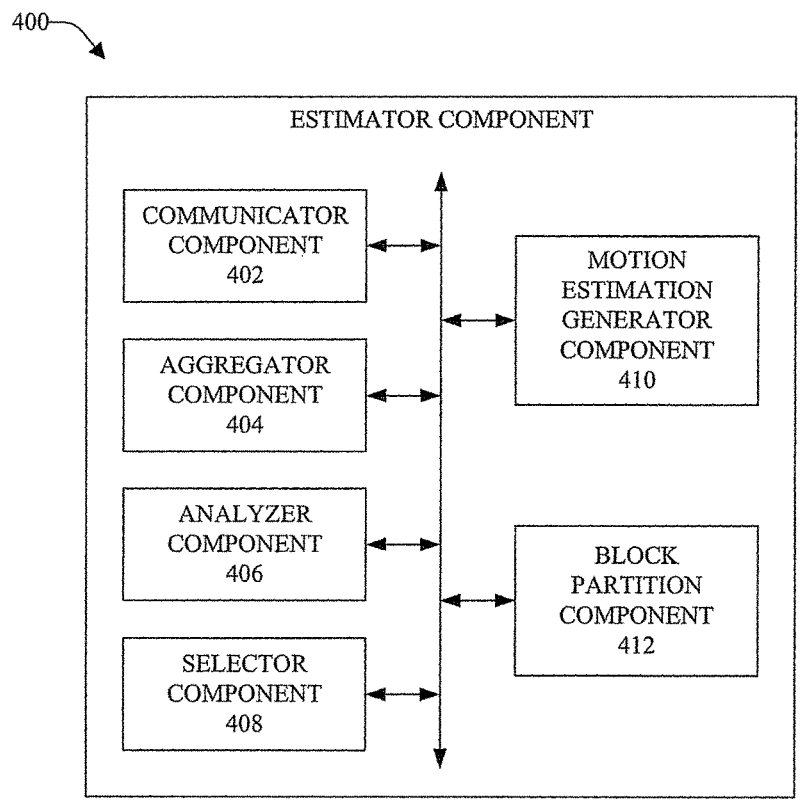
FIG. 4 illustrates a block diagram of an example estimator component in accordance with various aspects and implementations of this disclosure.

FIG. 4 depicts a block diagram of an example estimator component 400 in accordance with various aspects and implementations of this disclosure. The estimator component 400 can include a communicator component 402 that can be used to communicate (e.g., transmit, receive) information, including information relating to generating motion estimations and encoding data for raw video frames.

The estimator component 400 can contain an aggregator component 404 that can aggregate data received (e.g., obtained) from various entities (e.g., processor, data store, resource controller component, user interface, etc.). The aggregator component 404 can correlate respective items of data based at least in part on type of data, source of the data, time or date the data was generated or received, encoding state of the data, a video frame to which the data relates, etc., to facilitate analyzing the data.

The estimator component 400 can include an analyzer component 406 that can analyze (e.g., dynamically or automatically) data relating to generating motion estimations and encoding data for raw video frames, and can generate analysis results, based at least in part on the data analysis, to facilitate enabling the estimator component 400 to generate an initial motion estimation, including generating a subset of initial motion vectors, for a raw video frame. The estimator component 400 also can contain a selector component 408 that can select items of data, an applicable encoding-related algorithm (e.g., motion estimation algorithm), a macroblock of a raw video frame, or other information, to facilitate generating motion estimation and/or encoding data for a raw video frame.

The estimator component 400 can include a motion estimation generator component 410 that can generate a motion estimation, such as an initial motion estimation, of a raw video frame, for example, based at least in part on a previous raw video frame, as more fully disclosed herein. The motion estimation generator component 410 can generate respective motion estimations and/or respective subsets of motion vectors for respective blocks (e.g., macroblocks) of the raw video frame. For example, the motion estimation generator component 410 can generate a first subset of initial motion vectors for a first block of a raw video frame, and a second subset of initial motion vectors for a second block of the raw video frame, based at least in part on the previous raw video frame.

The estimator component 400 can contain a block partition component 412 that can partition, divide, or segment a raw video frame into a set of blocks, wherein each block in the set encompasses a respective portion of the raw video frame. The block partition component 412 can adjust partition parameters to adjust the size or shape of the blocks, for example, in response to a command to modify the block size or shape.

The estimator component 400 can contain, or can be associated with (e.g., communicatively connected to), one or more processors (not shown in FIG. 4; as depicted in FIG. 2) that can process data relating to encoding data and generating initial motion estimations for raw video frames, as more fully disclosed herein. The estimator component 400 also can include, or can be associated with (e.g., communicatively connected to), one or more data stores (not shown in FIG. 4; as depicted in FIG. 2) that can receive, store, and/or provide data relating to encoding data and generating initial motion estimations for raw video frames, as more fully disclosed herein.

Figure 5:
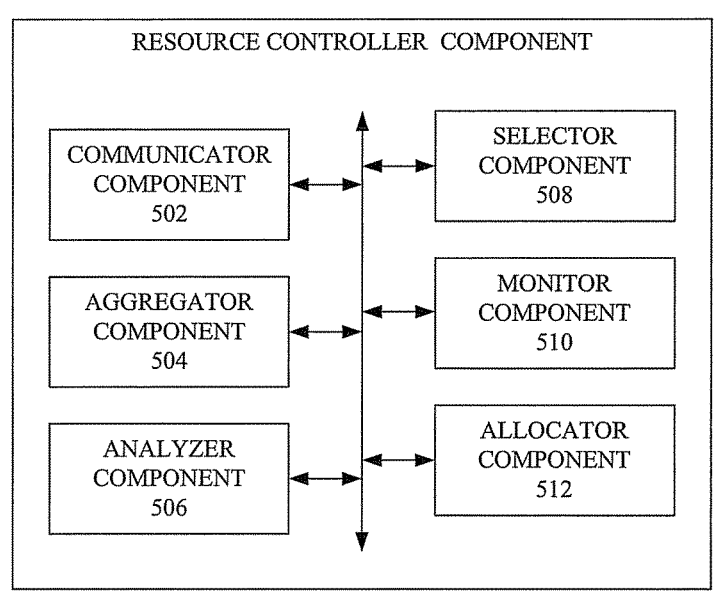
FIG. 5 presents a block diagram of an example resource controller component in accordance with various aspects of this disclosure.

FIG. 5 presents a diagram of an example resource controller component 500 in accordance with various aspects of this disclosure. The resource controller component 500 can include a communicator component 502 that can be used to communicate (e.g., transmit, receive) information, including information that can facilitate controlling resource allocation, including processor allocation, among various components, including an estimator component and coder component, to facilitate encoding of data.

The resource controller component 500 can contain an aggregator component 504 that can aggregate data received (e.g., obtained) from various entities (e.g., processor, data store, estimator component, coder component, user interface, etc.). The aggregator component 504 can correlate respective items of data based at least in part on type of data (e.g., statistics relating to previously encoded data, resource related data, etc.), source of the data, time or date the data was generated or received, etc., to facilitate analyzing of the data by an analyzer component 506. For example, the aggregator component 504 also can obtain, aggregate, and correlate statistics relating to previously encoded video frames, and those statistics can be used by the resource controller component 500 to facilitate rendering decisions on resource allocation during future encoding of video frames.

The resource controller component 500 can include the analyzer component 506 that can analyze (e.g., dynamically or automatically) data relating to allocating resources to various components (e.g., estimator component, coder component, etc.) to facilitate generating initial motion estimations, refining motion estimations, and/or encoding data associated with raw video frames. For example, the analyzer component 506 can analyze statistics relating to previously encoded video frames, motion estimation and/or refinement of motion estimation, information regarding available resources (e.g., available processors, available computing cycles, available bandwidth, etc.), and/or other information, to facilitate determining or identifying an efficient (e.g., most efficient, optimal) allocation of resources for encoding of data.

The analyzer component 506 can generate analysis results, based at least in part on the data analysis, to facilitate enabling the resource controller component 500 to efficiently and dynamically allocate resources to the various components during the encoding process. The resource controller component 500 also can contain a selector component 508 that can select items of data, an applicable encoding-related algorithm (e.g., resource allocation algorithm), or other information, to facilitate allocating resources to the various components during the encoding process.

In still other aspects, the resource controller component 500 can include a monitor component 510 that can monitor and/or detect conditions associated with the encoding process. The monitor component 510 can monitor and/or detect conditions, including, for example, parameter values relating to encoding, available processors, available computing cycles of respective processors, available amount of time to perform a particular encoding task, an amount of bandwidth for transmission of video, respective statuses of encoding for respective video frames (e.g., raw video frames), status of the estimator component, status of the coder component, and/or other conditions relating to encoding of a sequence of video frames. The resource controller component 500 can use (e.g., analyze) the information relating to the conditions associated with the encoding process to facilitate determining an appropriate allocation of resources at a given time.

In some implementations, the resource controller component 500 can contain an allocator component 512 that can allocate (e.g., dynamically or automatically) resources, to various components, including the estimator component and coder component, associated with the encoding process, based at least in part on the analysis results from the analyzer component 506 and the at least one predefined encoding criterion. The resources can include, for example, processors, computing cycles of respective processors, and/or other resources (e.g., computing-related resources, memory resources, etc.). The allocator component 512, via the communicator component 502, can transmit command information to respective processors to facilitate allocating the respective processors or computing cycles of the respective processors, or allocating other resources, to the various components, including the estimator component and coder component.

The resource controller component 500 can contain, or can be associated with (e.g., communicatively connected to), one or more processors (not shown in FIG. 5; as depicted in FIG. 2) that can process data relating to resource allocation for encoding of data, as more fully disclosed herein. The resource controller component 500 also can include, or can be associated with (e.g., communicatively connected to), one or more data stores (not shown in FIG. 5; as depicted in FIG. 2) that can receive, store, and/or provide data relating to resource allocation for encoding of data, as more fully disclosed herein.

The coder component 300, estimator component 400, and resource controller component 500 each disclose respective communicator components (e.g., 302, 402, 502), aggregator components (e.g., 304, 404, 504), analyzer components (e.g., 308, 406, 506), and selector components (e.g., 324, 408, 508), among other components disclosed herein. While these components (e.g., communicator components, aggregator components, analyzer components, selector components) are disclosed herein as being separate components, this disclosure is not so limited. In some implementations, the encoder component (e.g., 102, 202) and/or the coder component 300, estimator component 400 and/or resource controller component 500 associated with the encoder component, can use (e.g., share use of) the same component(s) (e.g., communicator component, aggregator component, analyzer component, selector component). In certain implementations, a particular component(s) (e.g., communicator component, aggregator component, analyzer component, selector component) can reside outside of the coder component 300, estimator component 400, and/or resource controller component 500 (e.g., as a stand-alone component, or a separate component within the encoder component), or can be distributed among a number of components (e.g., can at least partially reside in one or more other components).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems, components, and devices described above, example methods that can be implemented in accordance with this disclosure can be better appreciated with reference to flowcharts in FIGS. 6-10. For purposes of simplicity of explanation, various methods disclosed herein are presented and described as a series of acts; however, it is to be understood and appreciated that this disclosure is not limited by the order of acts, as some acts may occur in different order and/or concurrently with other acts from that shown and described herein. It is noted that not all illustrated acts may be required to implement a described method in accordance with this disclosure. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in this disclosure.

Figure 6:
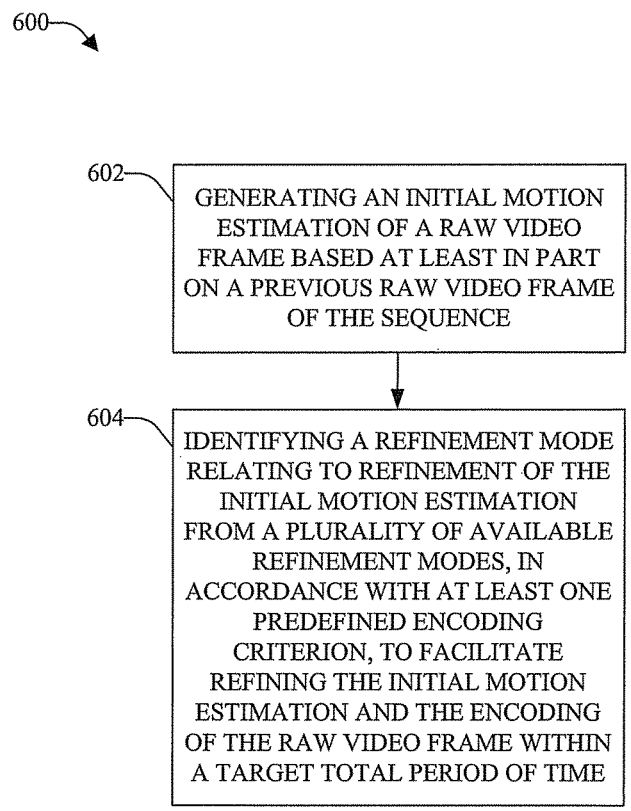
FIG. 6 presents a flow diagram of an example method for encoding a raw video frame of a video frame sequence, in accordance with various aspects and implementations.

With reference first to FIG. 6, illustrated is a flow diagram of an example method 600 for encoding a raw video frame of a video frame sequence, in accordance with various aspects and implementations. At 602, an initial motion estimation of a raw video frame can be generated (e.g., using an estimator component) based at least in part on a previous raw video frame of the sequence. The raw video frame and the previous raw video frame can be part of a sequence of raw video frames of a video to be encoded. At 604, a refinement mode relating to refinement of the initial motion estimation can be identified (e.g., dynamically or automatically) from a plurality of available refinement modes (e.g., a plurality of available modes of refinement motion search), in accordance with at least one predefined encoding criterion, to facilitate refining the initial motion estimation and the encoding of the raw video frame within a target total period of time. The predefined encoding criterion can relate to, for example, available bandwidth (e.g., associated with a communication channel available for transmission of an encoded video frame), available computing cycles (e.g., for encoding a raw video frame or performing motion estimation of a raw video frame), available amount of time to refine the motion estimation, quantization values associated with the raw video frame, residual data associated with the raw video frame, block types in a segment of the raw video frame, segment position in the raw video frame, statistical information relating to previously encoded video frames or slices, etc., as more fully disclosed herein. The coder management component can identify and select the refinement mode to refine (or not refine) the initial motion estimation of a portion (e.g., video segment) of the raw video frame. The coder component can refine (or not refine) the initial motion estimation for that frame portion, based at least in part on the available time to code the frame portion and the at least one predefined encoding criterion. The coder component also can perform other coding functions to encode the raw video frame, or portions thereof.

Figure 7:
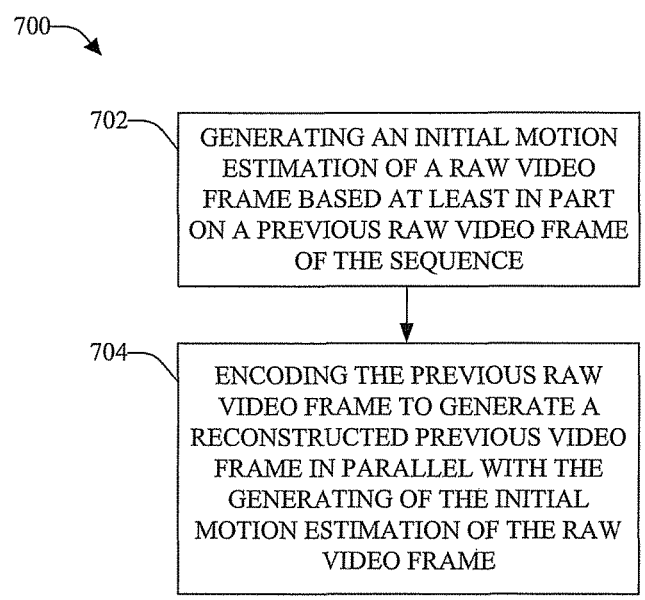
FIG. 7 illustrates a flow diagram of an example method for generating an initial motion estimation of a raw video frame in parallel with encoding a previous raw video frame, in accordance with various aspects and implementations.

Referring next to FIG. 7, depicted is a flow diagram of an example a method 700 for generating an initial motion estimation of a raw video frame in parallel with encoding a previous raw video frame, in accordance with various aspects and implementations. At 702, an initial motion estimation of a raw, video frame can be generated (e.g., using an estimator component) based at least in part on a previous raw video frame of the sequence. The raw video frame and the previous raw video frame can be part of a sequence of raw video frames of a video to be encoded by an encoder component or codec.

At 704, the previous raw video frame (e.g., copy of the previous raw video frame) can be encoded, in part, to generate (e.g., produce) a reconstructed previous video frame in parallel with the generating of the initial motion estimation of the raw video frame. A coder component can encode the previous raw video frame to generate an encoded previous video frame for use (e.g., presentation, transmission, etc.). As part of the encoding process, the coder component also can decode the encoded previous video frame to reconstruct the encoded previous raw video frame to generate a reconstructed previous video frame. If the coder component determines refinement of the initial motion estimation of the raw video frame is to be performed, the coder component can use the reconstructed previous video frame to refine the initial motion estimation for the raw video frame, in accordance with the at least one predefined encoding criterion.

Figure 8:
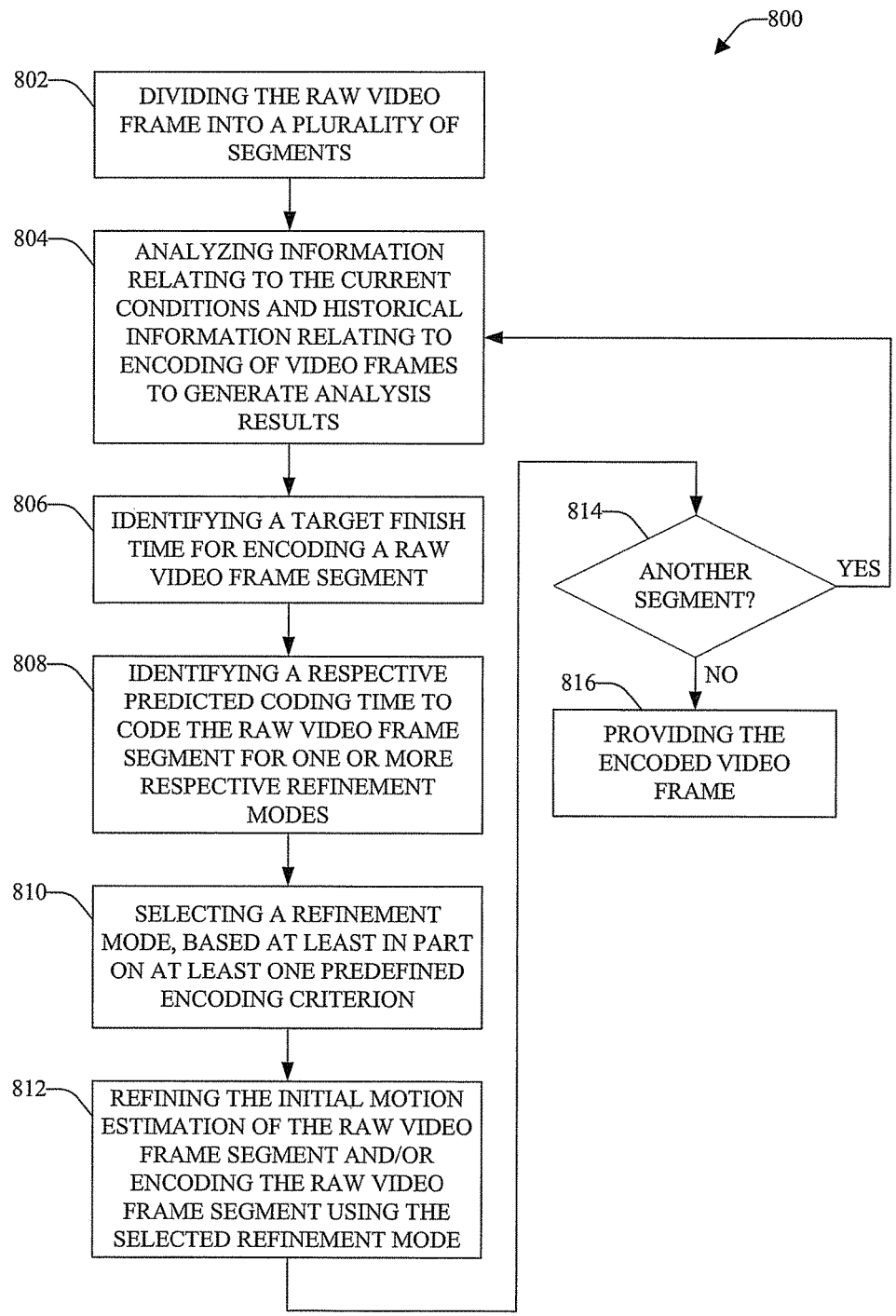
FIG. 8 is a flow diagram of an example method for managing (e.g., dynamically or automatically) coding time in relation to encoding digital media data (e.g., raw video frames of a video), in accordance with various aspects and implementations.

FIG. 8 illustrates a flow diagram of an example method 800 for managing (e.g., dynamically or automatically) coding time in relation to encoding digital media data (e.g., raw video frames of a video), in accordance with various aspects and implementations. The method 800 can be used, for example, after the encoder component (e.g., estimator component of the encoder component) has generated an initial motion estimation for a raw video frame of a sequence of raw video frames, and encoded (e.g., using a coder component) a previous video frame of the sequence, in part, to generate a reconstructed previous video frame.

At 802, the raw video frame can be divided (e.g., equally) into a plurality of segments. The coder management component can divide the raw video frame (e.g., digital media data of the raw video frame) into the plurality of raw video frame segments (e.g., respective portions of the digital media data), which can be virtually any desired number of segments. At 804, information relating to the current conditions and historical information relating to encoding of raw video frames can be analyzed (e.g., using an analyzer component) to generate analysis results relating to motion estimation refinement and encoding time to encode the raw video frame segments.

At 806, a target finish time for encoding a raw video frame segment can be identified. Based at least in part on the analysis results, the coder management component can identify the target finish time for the raw video frame segment. At 808, a respective predicted coding time to code the raw video frame segment can be identified for one or more respective refinement modes. The coder management component can identify respective predicted coding times of respective refinement modes based at least in part on the analysis results.

At 810, a refinement mode can be selected to refine (or not refine) the initial motion estimation of and encode the raw video frame segment, based at least in part on at least one predefined encoding criterion, wherein the selected refinement mode is the mode that provides the best compression quality possible while also coding the raw video frame segment within the target finish time (except where the no refinement mode is selected such as because, in such an instance, the target finish time is not able to be met even with no refinement of the initial motion estimation of the raw video frame segment). The coder management component, applying one of the available types of predefined encoding algorithms, can select (e.g., dynamically or automatically) the appropriate refinement mode to provide the best compression quality when coding the raw video frame segment while also meeting the target finish time associated with the segment in order to meet real-time coding requirements, as more fully described herein.

At 812, the initial motion estimation of the raw video frame segment can be refined and/or the raw video frame segment can be encoded using the selected refinement mode (e.g., by the coder component). At 814, a determination can be made (e.g., by the coder management component) regarding whether there is another raw video frame segment of the raw video frame that is to be encoded. If it is determined that there is another raw video frame segment that remains to be encoded, the method 800 can return to reference numeral 804, wherein to analyze encoding-related information relating to the next raw video frame segment to be encoded. As part of the analysis of the encoding-related information, the coder management component (e.g., using an analyzer component) can identify the actual amount of time used to code the raw video frame segment, and can calculate a target finish time for coding the next raw video frame segment as a function of the actual amount of time used to code the raw video frame segment, as more fully described herein.

If, at 814, it is determined that there is no other raw video frame segment of the raw video frame left to be encoded, at 816, the encoded video frame can be provided. If the coder management component determines that there is no other raw video frame segment of the raw video frame left to be encoded, the coder component can provide the encoded video frame for use (e.g., display of the reconstructed video frame, using the reconstructed video frame as a reference frame for coding of a next raw video frame, transmission or storage of the video frame, etc.), as desired. The method 800 can continue to code raw video frames, for example, until all or a desired portion of the raw video frames in the sequence have been coded.

Figure 9:
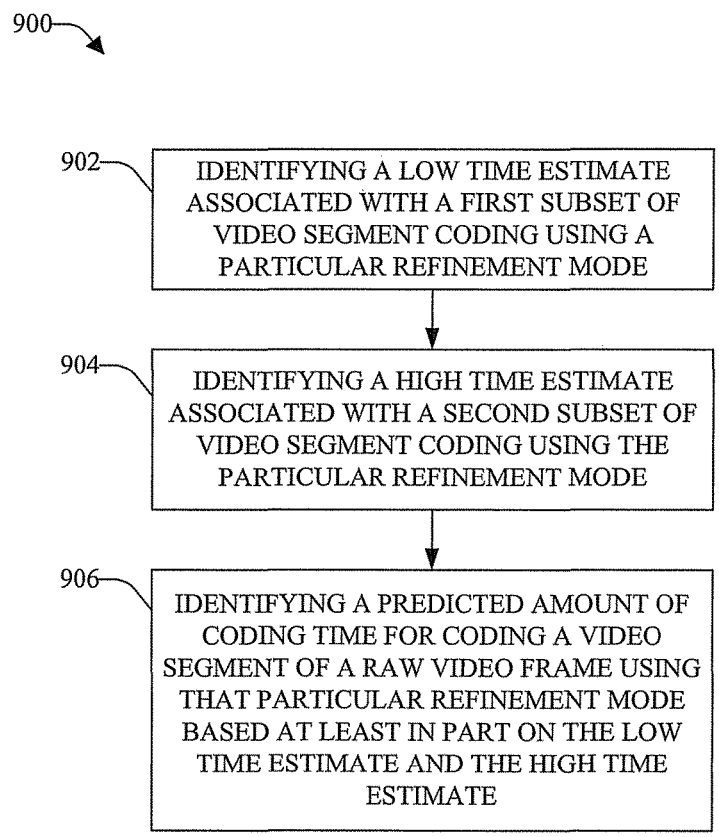
FIG. 9 depicts a flow diagram of an example method for determining a predicted amount of time to code a video segment of a raw video frame using a refinement mode, in accordance with various aspects and implementations.

FIG. 9 illustrates a flow chart of an example method 900 for determining a predicted amount of time to code a video segment of a raw video frame using a refinement mode, in accordance with various aspects and implementations. At 902, a low (e.g., a minimum or an average low) time estimate associated with a first subset of video segment coding (e.g., motion estimation refinement and/or coding) using a particular refinement mode can be identified, determined, or calculated (e.g., by a coder management component), based at least in part on encoding-related data (e.g., statistical data) associated with the particular refinement mode. At 904, a high (e.g., a maximum or an average high) time estimate associated with a second subset of video segment coding (e.g., motion estimation refinement and/or coding) using the particular refinement mode can be identified, determined, or calculated (e.g., by the coder management component), based at least in part on the encoding-related data associated with the particular refinement mode. A set of video segment coding can include the first subset and second subset, wherein the first subset includes one or more lower (and/or lowest) coding times, and the second subset includes one or more higher (and/or highest) coding times, for the particular refinement mode.

At 906, a predicted amount of coding time for coding a video segment of a raw video frame using that refinement mode can be identified, determined, or calculated based at least in part on (e.g., as a function of) the low time estimate and the high time estimate. The coder management component (or other component) can identify the predicted amount of coding time by calculating the average or median amount of time from the low time estimate and high time estimate. In some implementations, the coder management component (or other component) can identify the predicted amount of coding time by identifying a high time estimate associated with the second subset of video segment coding. The predicted amount of coding time for that particular refinement mode can be used to facilitate determining whether to use that particular refinement mode to code a video segment of a raw video frame.

Figure 10:
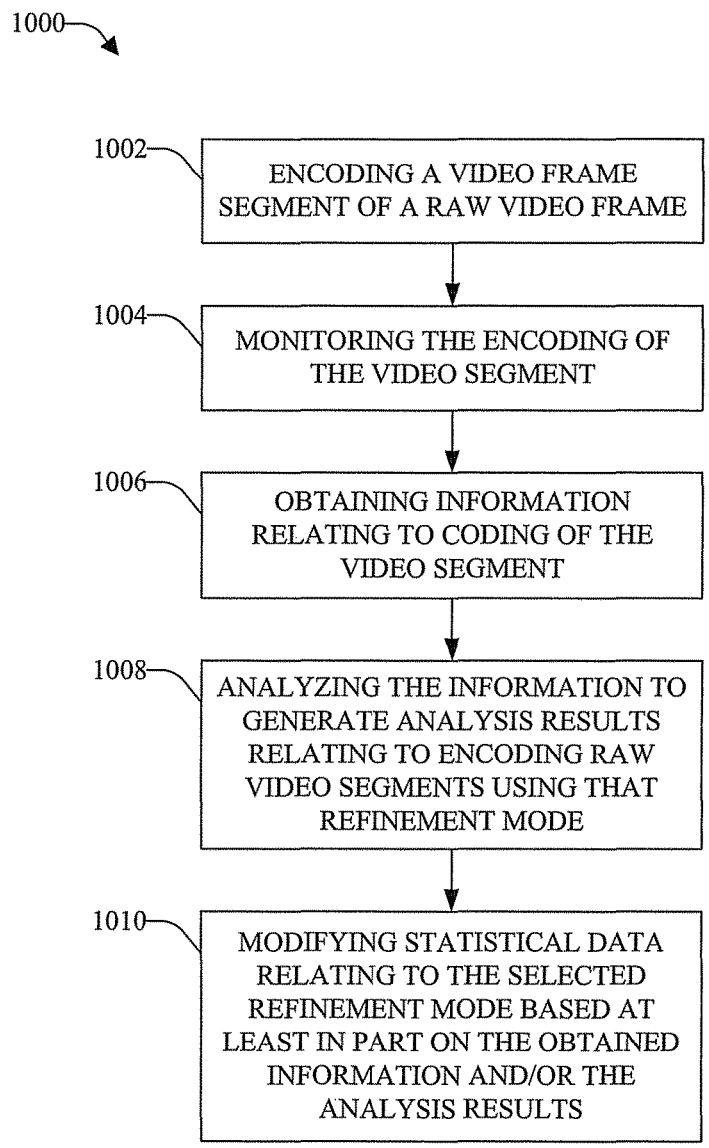
FIG. 10 illustrates a flow diagram of an example method for updating (e.g., dynamically or automatically) statistics relating to coding of a raw video frame, in accordance with various aspects and implementations.

FIG. 10 depicts a flow chart of an example method 1000 for updating (e.g., dynamically or automatically) statistics relating to coding of a raw video frame, in accordance with various aspects and implementations. At 1002, a video frame segment of a raw video frame can be encoded. The coder component can code the video segment using a selected refinement mode. The estimator component can generate an initial motion estimation for the raw video frame. The coder component can refine (or not refine) the initial motion estimation for the video segment of the raw video frame based at least in part on the selected refinement mode.

At 1004, the encoding of the video segment can be monitored. The coder management component can monitor the encoding of the video segment to identify information relevant to coding of video segments. At 1006, information relating to coding of the video segment can be obtained (e.g., collected). The coder management component can identify and/or obtain statistical information relating to the coding of the video segment.

At 1008, the information can be analyzed (e.g., dynamically or automatically) to generate analysis results relating to encoding raw video segments using that refinement mode. The coder management component can analyze the information relevant to coding of video segments using that refinement mode to generate such analysis results. The coder management component can identify the amount of time to code the video segment, the refinement mode, the quantization level used for encoding the segment, residual data, a block type(s) for that segment, segment position in the coding unit, etc., to facilitate generating the analysis results.

At 1010, statistical data relating to the selected refinement mode can be modified or updated (e.g., dynamically or automatically) based at least in part on the obtained information and/or the analysis results. The coder management component can modify the statistical data relating to the selected refinement mode to add the analysis results to previous statistical data relating to the selected refinement mode, adjust or revise statistical data relating to the selected refinement mode, etc. The coder management component can store the statistical data relating to the selected refinement mode, as such data is modified, for example, in a data store.

Figure 11:
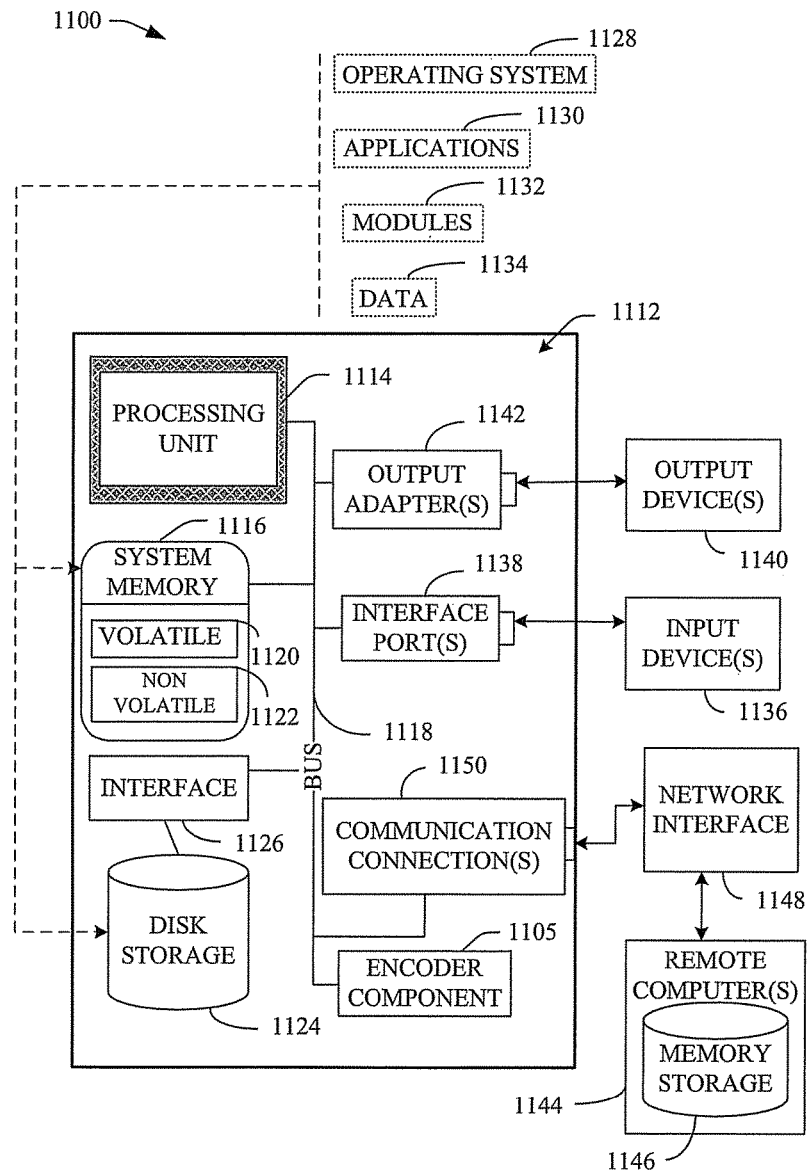
FIG. 11 is a schematic block diagram illustrating a suitable operating environment.
Figure 12:
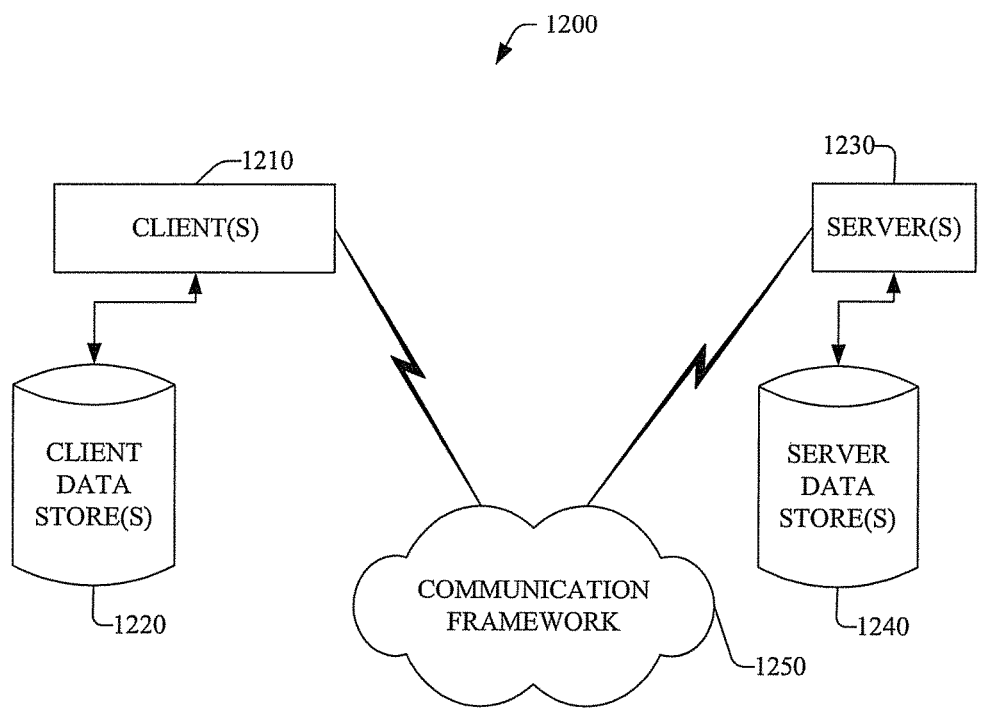
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

In accordance with various aspects and implementations, the computer (e.g., 1112) can be used to encode data, such as digital media data, which can be in the form of a sequence of video frames (e.g., raw video frames). As more fully disclosed herein, in some implementations, the computer can include a plurality of processors that can be used to process data, including performing various encoding tasks (e.g., generating initial motion estimation, determining whether to refine a motion estimation, refining a motion estimation, reconstructing a raw video frame, managing coding time in relation to refining an initial motion estimation of and/or encoding a raw video frame, setting or adjusting a search range in relation to refining a motion estimation of a raw video frame, etc.) on data (e.g., sequentially or in parallel). In certain implementations, the computer can include an encoder component 1105 (e.g., encoder, codec), which can contain an estimator component, a coder component, a coder management component, and/or a resource controller component.

With reference to FIG. 11, a suitable environment 1100 for implementing various aspects of this disclosure includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/nonvolatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be appreciated and understood that components (e.g., encoder component, estimator component, coder component, resource controller component, etc.), as described with regard to a particular system or method, can include the same or similar functionality as respective components (e.g., respectively named components or similarly named components) as described with regard to other systems or methods disclosed herein.

It is to be noted that aspects or features of this disclosure can be exploited in substantially any wireless telecommunication or radio technology, e.g., Wi-Fi; Bluetooth; Worldwide Interoperability for Microwave Access (WiMAX);

Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., encoder component, codec, estimator component, coder component, resource controller component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:
1. A method, comprising:
generating an initial motion estimation of a raw video frame of a sequence of video frames, based at least in part on a previous raw video frame;
obtaining encoding related statistics for a plurality of modes of refinement motion search, wherein the encoding related statistics for each of the plurality of modes of refinement motion search are based at least in part on actual amounts of time to encode previously-encoded video segments for using the respective mode of refinement motion search;
deriving predicted amounts of time to encode for at least some of the plurality of modes of refinement motion search based at least in part on the encoding related statistics; and
selecting a mode of refinement motion search from the plurality of modes of refinement motion search, in accordance with at least one predefined encoding criterion, to facilitate encoding of at least a portion of the raw video frame within a target total period of time by comparing the respective predicted amounts of time to encode for the at least some of the plurality of modes of refinement motion search; and
encoding the raw video frame using the selected mode of refinement motion search using at least one processor.

2. The method of claim 1, further comprising:
generating the initial motion estimation of the raw video frame in parallel with encoding the previous raw video frame, wherein the encoding of the previous raw video frame produces a reconstructed reference video frame.

3. The method of claim 1, further comprising:
dividing the raw video frame into a specified number of raw video frame segments; and
for a raw video frame segment of the specified number of raw video frame segments, identifying a target time to complete encoding of the raw video frame segment, wherein the target time is at least a portion of the target total period of time, and selecting the mode of refinement motion search that is able to provide higher compression quality for the raw video frame segment while enabling completion of the encoding of the raw video frame segment within the target time.

4. The method of claim 3, further comprising:
comparing a first predicted amount of time to encode with the target time; and
selecting a mode of refinement motion search for no refinement of the initial motion estimation of the raw video frame segment if the first predicted amount of time to encode is greater than the target time, wherein the first predicted amount of time to encode is associated with the mode of refinement motion search for no refinement of the initial motion estimation of the raw video frame segment.

5. The method of claim 3, further comprising:
comparing a second predicted amount of time to encode with the target time; and
selecting a quarter-pixel mode of refinement motion search to refine the initial motion estimation of the raw video frame segment to quarter pixel if the second predicted amount of time to encode is less than or equal to the target time, wherein the second predicted amount of time to encode is associated with the quarter-pixel mode.

6. The method of claim 5, further comprising:
comparing a third predicted amount of time to encode with the target time, wherein the third predicted amount of time to encode is associated with a full-pixel mode of refinement motion search to refine the initial motion estimation of the raw video frame to full pixel;
comparing a fourth predicted amount of time to encode with the target time, wherein the fourth predicted amount of time to encode is associated with a half-pixel mode of refinement motion search to refine the initial motion estimation of the raw video frame to half pixel; and
at least one of:
selecting the half-pixel mode to encode the raw video frame segment if the fourth predicted amount of time is less than or equal to the target time, based at least in part on the second predicted amount of time associated with the quarter-pixel mode being greater than the target time, or selecting the full-pixel mode to encode the raw video frame segment if the third predicted amount of time is less than or equal to the target time, and the fourth predicted amount of time is greater than the target time.

7. The method of claim 3, further comprising:
identifying a second target time to complete encoding of a second raw video frame segment of the specified number of raw video frame segments, and selecting a second type of mode of refinement motion search from the plurality of modes of refinement motion search, wherein the second type of mode of refinement motion search provides higher compression quality for encoding the second raw video frame segment while also enabling completion of the encoding of the second raw video frame segment within the second target time, and wherein the second type of mode of refinement motion search is same as or different than the mode of refinement motion search used to encode the raw video frame segment.

8. The method of claim 1, wherein selecting the mode of refinement motion search is performed such that the selected mode of refinement motion search provides a highest available compression quality for the portion of the raw video frame that enables completion of the encoding of the portion of the raw video frame within the target total period of time.

9. The method of claim 1, wherein the predefined encoding criterion relates to at least one of available bandwidth associated with a communication channel available for transmission of an encoded video frame, available computing cycles for encoding a raw video frame or performing motion estimation of a raw video frame, available amount of time to refine an initial motion estimation, quantization values associated with the raw video frame, residual data associated with the raw video frame, block types in a segment of the raw video frame, segment position in the raw video frame, or statistical information relating to previously encoded video frames or slices.

10. The method of claim 1, wherein deriving predicted amounts of time to encode for at least some of the plurality of modes of refinement motion search is based on a low time estimate and a high time estimate for the respective refinement mode from the plurality of refinement modes.

11. An apparatus, comprising:
a memory having instructions stored therein; and
a processor associated with the memory, wherein the instructions, when executed by the processor, cause the processor to:
generate an initial motion estimation of a raw video frame of a sequence of video frames, based at least in part on a previous raw video frame,
obtain encoding related statistics for a plurality of modes of refinement motion search, wherein the encoding related statistics for each for each of the plurality of modes of refinement motion search are based at least in part on actual amounts of time to encode previously-encoded video segments for using the respective mode of refinement motion search,
derive predicted amounts of time to encode for at least some of the plurality of modes of refinement motion search based at least in part on the encoding related statistics, and
select a mode of refinement motion search from the plurality of modes of refinement motion search, in accordance with at least one predefined encoding criterion, to facilitate encoding of at least a portion of the raw video frame within a target total period of time by comparing the respective predicted amounts of time to encode for the at least some of the plurality of modes of refinement motion search; and
encode the raw video frame using the selected mode of refinement motion search using at least one processor.

12. The apparatus of claim 11, wherein the instructions further cause the processor to:
generate the initial motion estimation of the raw video frame in parallel with encoding the previous raw video frame, wherein the encoding of the previous raw video frame produces a reconstructed reference video frame.

13. The apparatus of claim 11, wherein the instructions further cause the processor to:
divide the raw video frame into a specified number of raw video frame segments, and
for a raw video frame segment of the specified number of raw video frame segments, identify a target time to complete encoding of the raw video frame segment, wherein the target time is at least a portion of the target total period of time, and selecting the mode of refinement motion search that is able to provide higher compression quality for the raw video frame segment while enabling completion of the encoding of the raw video frame segment within the target time.

14. The apparatus of claim 13, wherein the instructions further cause the processor to:
compare a first predicted amount of time to encode with the target time, and
select a mode of refinement motion search for no refinement of the initial motion estimation of the raw video frame segment if the first predicted amount of time to encode is greater than the target time, wherein the first predicted amount of time to encode is associated with the mode of refinement motion search for no refinement of the initial motion estimation of the raw video frame segment.

15. The apparatus of claim 13, wherein the instructions further cause the processor to:
compare a second predicted amount of time to encode with the target time, and
select a quarter-pixel mode of refinement motion search to refine the initial motion estimation of the raw video frame segment to quarter pixel if the second predicted amount of time to encode is less than or equal to the target time, wherein the second predicted amount of time to encode is associated with the quarter-pixel mode.

16. The apparatus of claim 15, wherein the instructions further cause the processor to:
compare a third predicted amount of time to encode with the target time, wherein the third predicted amount of time to encode is associated with a full-pixel mode of refinement motion search to refine the initial motion estimation of the raw video frame to full pixel,
compare a fourth predicted amount of time to encode with the target time, wherein the fourth predicted amount of time to encode is associated with a half-pixel mode of refinement motion search to refine the initial motion estimation of the raw video frame to half pixel, and at least one of:
select the half-pixel mode to encode the raw video frame segment if the fourth predicted amount of time is less than or equal to the target time, based at least in part on the second predicted amount of time associated with the quarter-pixel mode being greater than the target time, or select the full-pixel mode to encode the raw video frame segment if the third predicted amount of time is less than or equal to the target time, and the fourth predicted amount of time is greater than the target time.

17. The apparatus of claim 13, wherein the instructions further cause the processor to:
identify a second target time to complete encoding of a second raw video frame segment of the specified number of raw video frame segments, and select a second type of mode of refinement motion search from the plurality of modes of refinement motion search, wherein the second type of mode of refinement motion search provides higher compression quality for encoding the second raw video frame segment while also enabling completion of the encoding of the second raw video frame segment within the second target time, and wherein the second type of mode of refinement motion search is same as or different than the mode of refinement motion search used to encode the raw video frame segment.

18. The apparatus of claim 11, wherein the instructions cause the processor to select the mode of refinement motion search such that the selected mode of refinement motion search provides a highest available compression quality for the portion of the raw video frame that enables completion of the encoding of the portion of the raw video frame within the target total period of time.

19. The apparatus of claim 11, wherein the predefined encoding criterion relates to at least one of available bandwidth associated with a communication channel available for transmission of an encoded video frame, available computing cycles for encoding a raw video frame or performing motion estimation of a raw video frame, available amount of time to refine an initial motion estimation, quantization values associated with the raw video frame, residual data associated with the raw video frame, block types in a segment of the raw video frame, segment position in the raw video frame, or statistical information relating to previously encoded video frames or slices.

20. The apparatus of claim 11, wherein the instructions cause the processor to derive the predicted amounts of time to encode for at least some of the plurality of modes of refinement motion search based on a low time estimate and a high time estimate for the respective refinement mode from the plurality of refinement modes.

* * * * *